United States Patent Office 3,705,919
Patented Dec. 12, 1972

3,705,919
REACTIONS OF ORGANO-METALLIC COMPOUNDS OF PLATINUM AND PALLADIUM GROUP VIII METALS WITH ETHYLENICALLY UNSATURATED COMPOUNDS
Richard F. Heck, Wilmington, Del., assignor to Hercules Incorporated, Wilmington, Del.
No Drawing. Continuation of application Ser. No. 659,899, Aug. 11, 1967, now abandoned, which is a continuation-in-part of applications Ser. No. 479,665, now Patent No. 3,527,794, Ser. No. 479,649, now Patent No. 3,413,352, and Ser. No. 479,605, now abandoned, all Aug. 13, 1965, and application Ser. No. 520,677, now abandoned, Jan. 14, 1966, which in turn is a continuation-in-part of said application Ser. No. 479,665. This application Feb. 8, 1971, Ser. No. 113,706
Int. Cl. C07c 67/00
U.S. Cl. 260—491            6 Claims

ABSTRACT OF THE DISCLOSURE

Useful organic compounds are produced by contacting an ethylenically unsaturated organic compound with an organometallic compound of a Group VIII metal having an atomic number in the range of 44–78 in the presence or absence of a cupric salt, and the organic compounds produced are condensation products of the organo group with the unsaturated organic compound.

This application is a continuation of my copending application Ser. No. 659,899, filed Aug. 11, 1967, now abandoned. Application Ser. No. 659,899 is, in turn, a continuation-in-part of applications Ser. Nos. 479,665, 479,649 and 479,605, all filed Aug. 13, 1965, and of application Ser. No. 520,677, filed Jan. 14, 1966, which, in turn, is a continuation-in-part of application Ser. No. 479,665, now U.S. 3,527,794, issued Sept. 8, 1970. Also, application Ser. No. 479,649, now is U.S. 3,413,352, issued Nov. 26, 1968. Applications Ser. Nos. 479,605 and 520,677 now are abandoned.

In accordance with Ser. No. 479,665, an organometallic compound of a Group VIII metal is reacted with an ethylenically unsaturated compound having a hydrogen on one of the ethylenic carbons, and the hydrogen is replaced by the organo group of the organometallic compound.

In accordance with Ser. No. 479,649, an organometallic compound of a Group VIII metal is reacted with an ethylenically unsaturated compound which is a vinyl alcohol ester of a carboxylic acid, and there is produced an organosubstituted aldehyde or ketone having no ethylenic unsaturation.

In accordance with Ser. No. 479,605, an organometallic compound of a Group VIII metal is reacted with an ethylenically unsaturated compound in which there is attached to an ethylenic carbon a —CH$_2$Z group where Z is (a) a halogen; (b) an ether group (—OR), or an ester group $$\left(-O\overset{O}{\underset{\|}{C}}-R\right)$$

or (c) a hydrogen, a —OH, a —COOH, a —COOR or a hydrocarbon group; and there is obtained an organo substituted ethylenic compound in which the Z group is displaced from the compound when Z is halogen or a member of the (b) group; and the conditions are such that the (b) group member is replaced by halogen in an initial step, and is retained when Z is a member of the (c) group.

In each of the above cases, a cupric salt is useful as a redox component whereby the Group VIII metal is regenerated and reused.

In accordance with Ser. No. 520,677, an organometallic compound of a Group VIII metal is reacted with an ethylenically unsaturated compound in the presence of a cupric halide whereby a saturated compound in which the organo group is attached to one of the formerly ethylenic carbons and the halide to the other.

It has now been found that when an ethylenically unsaturated compound is capable of reacting by virtue of its structural formula in more than one way, more than one product will result. It is, therefore, the object of the present invention to produce useful organic compounds by the reaction of an organometallic compound of a Group VIII metal of atomic number 44–78, with an ethylenically unsaturated organic compound in the presence or absence of a cupric salt in accordance with these earlier filed applications.

The process of this invention is carried out at a temperature in the range of −70 to 200° C. The temperature selected is variable as will be seen hereinafter in the examples. The preferred temperature range is 0 to 150° C., and temperatures in the range of 150 to 200° C. are used when required to complete an elimination or replacement reaction.

The organometallic compound of this invention is designated hereinafter by the formula QM'X, where Q is the organo group exemplified hereinafter, M' is a Group VIII metal of atomic number 44–78, and X is an anion.

The ethylenically unsaturated compound with which the organometallic compound reacts is a compound of the formula:

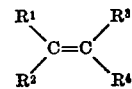

where R$^1$, R$^2$, R$^3$ and R$^4$ are radicals which influence the course of the reaction, and more specifically set forth hereinafter.

In the first stage of the reaction, the organometallic compound adds to the ethylenically unsaturated compound to produce an adduct of the formula:

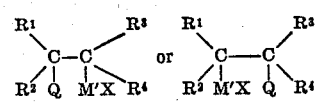

The adduct formed will depend on steric factors to a large degree. The adduct is not highly stable and is formed only in small amounts. Since the adduct is present in very small amounts, it is only by subsequent changes affecting the adduct that the reaction of this invention goes forward before the organometallic compound itself decomposes.

The organometallic compound, being a highly unstable compound with a short life, is used in the process of this invention in a freshly prepared state, and it is usually prepared in situ in the presence of the ethylenically unsaturated compound with which it is to react to form the adduct. This adduct subsequently changes to a stable compound and thereby carries the series of reactions forward to completion.

In the second stage of the process of this invention, in which the adduct of the organometallic compound and the ethylenically unsaturated compound changes to a metal compound and a stable organic compound, the structure of the latter depends on the nature of the R$^1$, R$^2$, R$^3$ and R$^4$ groups.

In the case where one of the R$^1$, R$^2$, R$^3$ and R$^4$ groups is hydrogen and the hydrogen is involved in the reaction, the change which the adduct undergoes is expressed as follows:

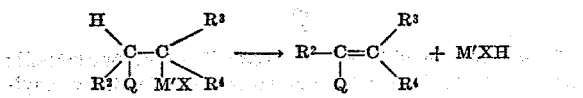

This reaction is reversible, but the reaction substantially goes to completion. If the organometallic compound had added to the ethylenically unsaturated compound in such a way that the M'X were on the carbon holding the hydrogen and the resulting adduct were incapable of other reactions, the low conversion would tie up very little of the ethylenically unsaturated compound and organometallic compound in the form of an adduct incapable of undergoing change.

In the case where the ethylenically unsaturated organic compound is a vinyl alcohol ester of a carboxylic acid, the change which takes place in the adduct whereby a carbonyl compound is produced is expressed as follows:

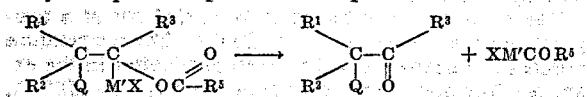

where $R^5$ is a hydrocarbon group free of ethylenic and acetylenic unsaturation. This equation expresses the result, but other mechanisms are possible to show the same result. Moreover, this equation is for the case in which $R^1$, $R^2$ and $R^3$ have not entered into the elimination reaction, and thus it expresses only one result. As in the case where no R is

if one of $R^1$, $R^2$ or $R^3$ is an active group, that active group will also react to some degree. Thus, the reaction of vinyl acetate with phenyl palladium chloride ($\phi$PdCl) forms the expected two adducts:

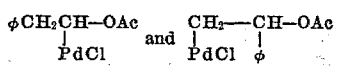

and these undergo elimination of a palladium compound with resultant formation of $\phi$CH=CH—OAc, $\phi$CH$_2$CHO and $\phi$=CH$_2$ depending on the conditions of acidity and concentration of reagents. Although the major products are $\phi$CH=CHOAc and $\phi$CH$_2$CHO derived from the adduct in which the Pd is attached to the carbon on which the —OAc is attached, there are also produced compounds derived from the other adduct, styrene being the only product detected in this particular example. Styrene is apparently produced by the mechanism of elimination of the —OAc group along with the PdX— group as PdClOAc. The styrene, being reactive with the $\phi$PdX in the system, reacts therewith and produces stilbene which is also isolated.

In the case where there is a —CH$_2$Z group attached to one of the ethylenic carbons of the ethylenically unsaturated compound, the organometallic compound will first form adducts of the formulas:

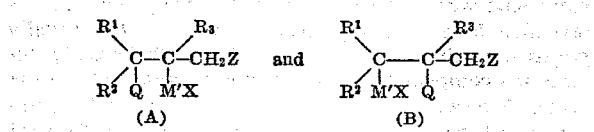

These are both possible intermediates, and they may both form. On the other hand, one may form preferentially to the other. Adduct (B) is capable of change involving $R^1$, $R^2$ or $R^3$ when one of $R^1$, $R^2$ and $R^3$ is an active group, but it is not capable of change involving CH$_2$Z. Adduct (A) is capable of change involving $R^1$, $R^2$ or $R^3$ like adduct (B) when one of the groups is an active group, and in addition is capable of undergoing change involving —CH$_2$Z. When Z is halogen Y, adduct (A) undergoes a change involving a splitting out of M'X and Y where Y designates the halogen which includes Cl, Br and I. When Z is

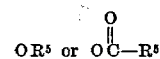

where $R^5$ is a hydrocarbon group free of ethylenic and acetylenic unsaturation and the system contains halogen and is acidic,

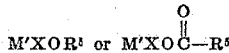

appears to split out in the same way as the halogen Y splits out. Moreover, when Z is OH and the system is rich in halogen ion M'X splits out as though OH were first replaced by halogen Y and M'XY splits out. When the conditions for Z to split out in one of these ways do not obtain, M'X then splits out with H from the —CH$_2$Z group. In those cases where M'XZ splits out, the resulting olefinic product has the formula:

In those cases where M'XH splits out, the resulting olefinic product has the formula:

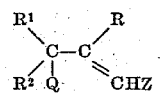

However, this product is usually not obtainable when Z is Cl, Br or I, which are more reactive than H. Z is thus a halogen (Cl, Br or I) which is reactive, an

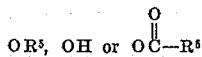

which is reactive only as a result of replacement by halogen under strongly acidic conditions, or is non-reactive under only mildly acidic or non-acidic conditions, or Z is an inactive radical such as one of the following groups: hydrocarbon free of ethylenic and acetylenic unsaturation

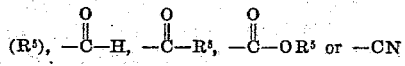

In the case of adduct (A) where the Z is not halogen either initially or as a result of reaction to introduce a halogen, the M'X group splits off with H from the —CH$_2$Z group forming M'XH when $R^1$ and $R^2$ are inactive groups, and the organic product is a compound of the formula:

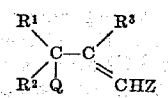

When one of $R^1$ and $R^2$ is hydrogen and Z is hydrogen or an inactive group, there is competition between groups as to which way the splitting out of M'XH or M'XY will take place, and the other possible product has the formula:

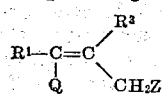

Likewise, if $R^3$ is a —CH$_2$— or —CH$_2$Z group, there will be competition such that the $R^3$ group will also participate in the splitting out reaction. In the case where Z is OH, and the conditions are such that it is not replaced by halogen, the product

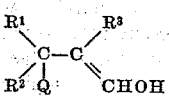

is the enol form of

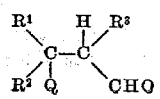

and the latter rearranged compound is the isolatable product. Likewise, when R'=H, some product of the structure $$R^2C=C-CH_2OH$$
$$\quad\ \ |\quad\ |$$
$$\quad\ \ Q\quad R^3$$

is formed.

In the case where $CuCl_2$ is added to the reaction system in which the adduct of an ethylenically unsaturated compound and QM'X is formed, the adduct reacts as follows:

$$\begin{array}{c} R^1\ \ H\ \ R^3 \\ \diagdown\ |\ \diagup \\ C-C \\ \diagup\ |\ \ \ \diagdown \\ R^2\ Q\ \ \ M'X \end{array} + CuCl \rightarrow \begin{array}{c} R^1\ \ H\ \ R^3 \\ \diagdown\ |\ \diagup \\ C-C \\ \diagup\ |\ \ \ \diagdown \\ R^2\ Q\ \ \ Cl \end{array} + M'XCl$$

This reaction is affected by the nature of the R groups as well as by the concentration of the $CuCl_2$ in the system. A concentration of 1 M $CuCl_2$ or greater is effective.

It is thus seen that when an ethylenically unsaturated compound is reacted with an organometallic compound of a Group VIII metal of atomic number 44-78, a variety of compounds is produced, the nature of which is dependent on what groups are present in the ethylenically unsaturated organic compound.

In the ethylenically unsaturated organic compound of the structure of the formula:

$$\begin{array}{cc} R^1 & R^3 \\ \diagdown & \diagup \\ & C=C \\ \diagup & \diagdown \\ R^2 & R^4 \end{array}$$

the values of $R^1$, $R^2$, $R^3$ and $R^4$ include the following groups:

Hydrocarbons having 1 to 30 carbons—aliphatic, aromatic and alicyclic monovalent radicals or taking any two R groups together as a divalent group, a divalent aliphatic, aromatic or alicyclic radical; said monovalent hydrocarbon radicals being exemplified by methyl, ethyl, propyl, isopropyl, butyl, isobutyl, sec-butyl and the like; benzyl α,α-dimethylbenzyl, phenyl, naphthyl, cumyl, tolyl, anthracenyl, phenanthryl and the like; cyclobutyl, cyclopentyl, cyclohexyl, norbornyl and the like; and said divalent hydrocarbon radicals being exemplified by —$CH_2CH_2CH_2CH_2CH_2$—, —$CH_2CH_2CH_2CH_2$—, $CH_2CH_2CH_2$—
$\qquad\qquad\qquad\qquad\qquad\qquad\qquad\qquad\qquad\qquad\qquad\qquad\qquad CH_2$
$\qquad\qquad\qquad\qquad\qquad\qquad\qquad\qquad\qquad\qquad\qquad\qquad\diagup\ \ \diagdown$
—$CH_2$—$C_5H_8$—$CH_2$—, —$CH$—$C(CH_3)_2CH$—$CH_2$—
$\diagup CH-CH_2$
—$CH$—$C(CH_3)_2$—$CH$—, —$C_6H_{10}$, $C_6H_4$—$CH_2$—, —$CH_2$—$C_6H_4$—$CH_2$— and the like, as they occur in cyclohexene, camphene, α-pinene, β-pinene, cyclopentene, benzalcyclohexane, cyclohexane and indene;

Heterocyclic groups such as thienyl and furyl;

Hydrocarbon or heterocyclic groups substituted by 1 to 3 non-hydrocarbon groups, the hydrocarbon groups or heterocyclic groups which are substituted, being set forth above and the non-hydrocarbon groups with which they are substituted, being the same as those set forth below and, in addition, —OH; and Non-hydrocarbon groups: —H, —Cl, —Br, —I, —F, —$OR^6$, —$OCOR^6$, —$NO_2$, —CHO, —$COOR^6$, —$NR^5_2$, —$CONR^5_2$, —CN—, —$SO_2R^6$, —COOH, —COOMetal, —$COR^6$, where $R^5$ represents any one or different hydrocarbon group containing no ethylenic or acetylenic unsaturation and containing 2 to 12 carbon atoms, and $R^6$ represents $R^5$ or $CH_3$—.

The organometallic compounds of formula QM'X are those in which the Q group is an organic group capable of forming an organometallic compound of the metal M' which is a metal in the platinum and palladium subgroups of Group VIII. The Q group is a group which bonds to the metal M' by a carbon-metal linkage. The organo group Q is a member of the following groups:

a carboalkoxy group containing 1 to 4 alkyl carbons and no unsaturation;

a hydrocarbon group having 1 to 20 carbons, at least one of which carbons is the point of attachment to the metal, and to which point of attachment no carbon bearing a hydrogen is attached, and said hydrocarbon group contains no ethylenic or acetylenic unsaturation;

a said hydrocarbon group, at least one and not more than 5 hydrogen atoms in which is substituted by lower alkyl ($C_1$-$C_4$), lower alkoxy ($C_1$-$C_4$), —CHO, —COOH, —COO lower alkyl, —Cl, —$NO_2$, —$NHCOCH_3$, or —$N(C_2H_5)_2$;

a thienyl, furyl, benzothienyl, or benzofuryl group.

The Q group includes the following groups: furyl thienyl, benzothienyl, -carboxylalkyl, methyl, t-butyl, $ArCH_2$— and Ar—, where Ar is unsubstituted aryl such as phenyl, naphthyl, anthryl, phenanthryl, fluorenyl, and aryl substituted by at least one of the following groups: lower alkoxyl ($C_1$-$C_4$), lower alkyl ($C_1$-$C_4$), —CHO, —COOH, —COO— lower alkyl, —Cl, —$NO_2$,

—$NHCOCH_3$

—$N(C_2H_5)_2$, and is exemplified further by such radicals as: —Ar[OC(O)$CH_3$]CHO, $(CH_3O)_yAr$—, $(Cl)_yAr$—, $(Br)_yAr$—, $(F)_yAr$—, $Cl(CH_3O)Ar$—, $Br(CH_3O)Ar$—, $F(CH_3O)Ar$—, $(NO_2)_yAr$—, $R^6OC(O)Ar$—, $CH_3C(O)NHAr$—

$R^6OAr$—, $CH_3C(O)OAr$—, $CH_3C(O)OAr(COOH)$—, $CH_3C(O)OAr(COOR^5)$—, —ArC(O)Ar, —ArCOOH, —ArCHO, $(CH_3)_yAr$—, —Ar(OH)CHO,

—$Ar(COOR^6)_y$ and $Ar_yAr$—; where y is a whole number from 1 to 5; and Ar is a benzenoid ring compound such as phenyl, naphthyl, anthracenyl, phenanthryl, benzothienyl, fluorenyl and ring substitution products; and Q is also exemplified by —Q(M'$X_2$)$_y$ which is a polyvalent organyl group in an organometallic compound having more than one carbon-metal linkage.

The metals of the organometallic compound of Group VIII which are operable are metals of atomic number 44-78 which are Ru, Rh, Pd, Os, Ir and Pt. The preferred group is the Pd group, and the preferred metal is Pd.

The anion X, of the organometallic compound QM'X used in this invention is selected from the following: F, Cl, Br, CN, $NO_3$, $SO_4$, $HSO_4$, carboxylate anions such as acylate (up to 10 carbons); e.g., $CH_3CO_2$ (acetate), benzoate and trifluoroacetate.

The organometallic compound of the Group VIII metal can be made directly in many cases, e.g., by the reaction:

$$QH + M'X_2 \rightarrow QM'X + HX$$

An example of this is the reaction of benzene with palladium diacetate to form phenyl palladium acetate. A more general method is the indirect method.

The organometallic compound QM'X or QM'$X_2$ is prepared indirectly by reaction of a salt of the Group VIII metal with an organometallic compound of a metal of Group II–B, III–A, or IV–A of the periodic chart and an organic residue, Q. This reaction may be expressed as follows:

$$QMX + M'X_2 \rightarrow QM'X + MX_2$$

for the case where M and M' both have a valence of II, and M is a Group II–B metal. Although $Q_2M$, $Q_3M$, $Q_4M$, $Q_2MX$ and $Q_3MX$ can be similarly used, the formula QMX will be used for illustration purposes, it being understood that M may be any of the metals of the above designated groups, and that the actual formula will depend on the metal used and its valence.

In the preparation of the organometallic compound QM'X, there may be used such organometallic compounds as $Q_2Zn$, $Q_2Cd$, $Q_2Hg$, QZnX, $QSnX_3$, $Q_2SnX_2$, QCdX, QHgX, $Q_3Al$, $Q_2AlX$, $QAlX_2$, $QTlX_2$, $Q_4Sn$, $Q_4Pb$, and the like. The organometallic compounds of Groups III–A and zinc are stable to heat but so highly reactive with water and air that they must be used with special precautions. On the other hand, the organometallic compound of the Group VIII metal is relatively unreactive to water, but is unstable to heat. The reaction to produce QM′X from a reaction QMX is thus carried out in an inert atmosphere, an inert solvent and at a low temperature, preferably well below 0° C., e.g., at −20 to −80° C.

In the case of Group II–B organometallic compounds represented by the formula QMX, these are well known for Zn, Cd and Hg. These are not at all equal in their properties and are handled differently. The organometallic compounds are highly reactive with water and with many organic functional groups which precludes their use when Q contains functional groups which react with zinc organometallics. The organometallic compounds of Cd have mild reactivity, but must be used in non-aqueous medium and are of limited value. The organometallic compounds of mercury are different from the others in that they do not react with water and for this reason are the most useful organometallic compounds of the Group II–B metals for use in this invention.

Organometallic compounds of Group III–A metals, such as Al, Ga, In and Tl are useful, but those of aluminum are most practical. Organometallic compounds of the Group III–A metals exemplified by aluminum may have the formula $Q_3Al$, $Q_2AlX$ or $QAlX_2$, and in this case the X is preferably the chloride. The preparation of organometallic compounds of these metals is well known. The range of Q groups which can be used is somewhat limited, but Q groups such as $CH_3—$, phenyl and alkylated phenyl are most readily produced.

Organometallic compounds of Group IV–A metals are those of Ge, Sn and Pb. These are generally prepared from organometallic compounds of Group I–A or Group II–A metals and the Q groups are limited only by the limitations of reactivity of the organometallic compounds with functional groups that may be present in the Q group. Some of these organometallic compounds are water sensitive and are limited in utility from that standpoint. The tin and lead organometallic compounds are of greatest utility of this group. The tin organometallic compounds can be in the lower or higher valence states. They are formed from organometallic compounds of Group I–A or II–A and the tin chloride. It is convenient in some cases to produce the tin organometallics from the mercury organometallic, e.g., by reaction of the stannous chloride, to form the stannic organometallic compound. Methyl and phenyl tin compounds and substituted phenyl tin compounds are quite suitable for this invention. The lead compounds are prepared similarly to the tin compounds, and the organolead compounds are also readily prepared by other methods. They are less reactive with water and have advantages in this respect for use in this invention.

The organomercury compounds are the most generally useful of the various organometallic compounds discussed above because of their ease of preparation, even in aqueous solution, and because of the variety of organic Q groups which may be introduced thereby.

The various methods of preparation and the properties of organometallic compounds which are useful in this invention are discussed in great detail in "Organometallic Compounds," by G. E. Coates, second edition, 1960, John Wiley & Sons, Inc., New York.

In carrying out process of this invention the organometallic compound of the Group VIII metal is produced by the reaction of a Group VIII metal salt with one of the organometallic compounds of the Group II–B, II–A, or IV–A metals, and the organic Q group is transferred to the Group VIII metal. The organometallic compound of the Group VIII metal sometimes has a short life period at ordinary temperature, and in such a case must be used promptly or be maintained at reduced temperatures well below room temperature of 24° C. and preferably at a temperature in the range of −20 to −80° C. until used. The usual procedure is to use the organometallic compound promptly without purification, and it can even be produced in situ in the presence of the olefinic compound with which it is to react when the organometallic compound used for preparing QMX is not reactive with the ethylenically unsaturated compound.

In the process of this invention the preferred method of producing the organometallic compound of the Group VIII metal of atomic number 44–78 is by reaction of an organometal compound where the metal is tin, lead or mercury with the Group VIII metal salt. Of this group, mercury is most versatile. Moreover, the organomercury salt can be prepared in situ in the presence of the Group VIII metal salt as an alternative to preparing it prior to use for reaction with the Group VIII metal salt. When the organomercury salt is prepared in situ, the organo compound and mercury salt are such that they will react under the conditions for the subsequent or simultaneous reaction with the Group VIII metal salt. The preparation of organomercury salts is well known in the art. This is exemplified by the reaction of benzene with mercuric acetate to produce phenylmercuric acetate and the reaction of thiophene with mercuric chloride to produce thienyl mercuric chloride. Other similar reactions are also known.

In the process of this invention, the manner in which the Group VIII metal is eliminated from the adduct determines the product of the process. Where the elimination is possible in more than one way, there will be more than one product. The group most readily eliminated from the adduct with the Group VIII metal will determine the product obtained in greatest amount. The order of selectivity of elimination of the various groups with the Group VIII metal is not sharp since many factors influence this. However, it has been observed that a halide on the carbon adjacent to the carbon holding the M′X group will be eliminated more readily than any other group in the same position. A

an —$OR^5$ and an OH are only eliminated by first undergoing replacement by an X. When there is more than one eliminatable group on an adjacent carbon, there is a possibility that more than one product will be produced. The OH group is not eliminated in preference to an H unless the conditions are such that the OH is first converted to a halogen. Conditions whereby the OH, —$OCOR^5$ or —$OR^5$ group may be thus eliminated in the reaction are acidic conditions corresponding to those already known in the organic chemical art for the replacement of these groups by halogen.

When there is an alternative between elimination of hydrogen on more than one adjacent carbon to the carbon holding the M′X group and one of those adjacent carbons holds also an —OH group, the H on that carbon will be eliminated preferentially. When this happens, the product is a vinyl alcohol which rearranges to the carbonyl compound, i.e., aldehyde or ketone.

When M′X in the adduct is on a carbon holding also an

group, the elimination of this group with the M′X will take place as M′XCOR$^6$ so that a carbonyl is created from the carbon holding those groups in the adduct. A hydrogen, a halogen or an OR$^6$ on the same carbon as the M′X group in the adduct does not eliminate with the M′X group with any degree of preference.

In carrying out the process of this invention using less than a stoichiometric amount of precious metal, the precious metal is recovered and reconverted to a useful salt, or the precious metal is converted to a useful salt in situ. The in situ regeneration of palladium or rhodium can be conveniently brought about by cupric chloride or bromide. The reaction involved in the regeneration from the free metal to the salt is represented by the equation:

$$Pd + 2CuCl_2 \rightarrow PdCl_2 + 2CuCl$$

The free metal Pd forms by a breakdown of the PdXH elimination product. The cuprous chloride is regenerated to cupric chloride by known methods such as air oxidation in the presence of halide acid, e.g:

$$2CuCl + 2HCl + \tfrac{1}{2}O_2 \rightarrow 2CuCl_2 + H_2O$$

The palladium can be oxidized to useful salt alternatively by means of mercuric acetate, ferric nitrate, thallic chloride or lead tetraacetate.

When cupric halide is used in situ for regenerating the Group VIII metal, the copper halide may react with the adduction whereby halide is introduced into the product in the manner indicated hereinabove. This reaction may predominate when the concentration of the cupric halide is greater than about 1 molar in the reaction medium. When cupric halide is used for regenerating the precious metal, the concentration of cupric halide is maintained less than 1 molar during the process unless it is determined by testing that the halogen replacement does not take place with the particular reagents at greater than 1 molar concenration. By reducing the halide ion content, this replacement reaction can likewise be reduced.

When it is particularly desired to effect the introduction of halide by using the reaction of cupric halide with the adduct in accordance with this invention, the amount of copper halide is maintained above about 1 molar and the necessary excess over 1 molar is determined by a preliminary test. The concentration for best results will in many cases be found to be as high as 2 molar.

PRODUCTS

Product of this invention are exemplified by the following:

styrene
cis-propenylbenzene
cinnamaldehyde
benzalacetone
methyl cinnamate
methyl 2-methyl cinnamate
dimethyl salicylaldehyde-3,5-bis-(3-acrylate)
methyl 2-methoxy-3-phenylpropionate
3-(2-naphthyl)acrolein
3-(2-naphthyl)acrylonitrile
methyl-3-(2-naphthyl)acrylate
dimethyl mesitylene-2,4-bis(3-acrylate)
methyl p-diethylaminocinnamate
methyl p-methoxycinnamate
methyl crotonate
methyl m-nitrocinnamate
methyl 3-(2-thienyl)acrylate
trans-propenylbenzene
allylbenzene
methyl p-acetamidocinnamate
methyl o-hydroxycinnamate
methyl 3,4-dichlorocinnamate
methyl m-carbomethoxycinnamate
methyl m-formylcinnamate
methyl p-carbomethoxycinnamate
methyl 3-benzoylphenylacrylate
dimethyl 3,3′-benzophenone-bis(acrylate)
methyl p-phenylcinnamate
2-(2-naphthyl)-3-phenyl-1-propene
methyl 3-nitro-4-methoxycinnamate
stilbene
trans-2-naphthyl-1-phenylethylene
1-naphthyl-2-phenyl-1-propene
1,2-diphenylpropene
1-p-anisyl-2-phenylpropene
1-phenyl-2-anisylpropene
3,5-bis(1-buten-3-one)salicylaldehyde
3-(2-naphthyl)acrylonitrile
methyl 3-nitro-4,5-dichlorocinnamate
dimethyl 5-nitro-1,3-benzene bis-(3-acrylate)
3-formylstilbene
2,3,4,5,6-pentamethylstilbene
4-methoxy-4′-phenylstilbene
4-methoxy-3-nitro-4′-phenylstilbene
cinnamyl ethyl ether
cinnamyl acetate
3-phenylbutenyl acetate
trans 1,3-diphenyl propene
4-isopropylstilbene
salicylaldehyde-3,5-bis-[1-(1-buten-3-one)]
phenylacetaldehyde
phenylacetone
naphthylacetaldehyde
hydrotropaldehyde
2-naphthylacetone
2,2-dimethyl-2-phenylacetaldehyde
benzyl phenyl ketone
p-carboxybenzyl methyl ketone
benzyl methyl ketone
p-nitrobenzyl phenyl ketone
2-(4-phenyl)phenylpropionaldehyde
3,4-dichlorobenzyl p-anisyl ketone
2-phenylpropionaldehyde
2-phenyl-2-methylpropionaldehyde
3,3′-dinitrostilbene
3,3′-bis(carbomethoxy)stilbene
1,2-di-p-anisyl-1-propene
1,2-di(3-nitrophenyl-1-propene)
4-carboxybenzyl methyl ketone
3-nitrobenzyl phenyl ketone
p-anisylpropionaldehyde
estragole
methallylbenzene
2,3-dimethyl-3-phenylbutene-1
4-propenylbenzoic acid
3-phenyl-1-butene
trans-1-phenyl-2-butene
1-phenyl-1-butene
1-phenyl-2-chloropropene
4-allyl-N,N-diethylaniline
dimethyl-3,3′-diphenyldicarboxylate
methyl 4-allylbenzoate
1-(3-nitrophenyl)-2-chloro-1-propene
3,4-dichloroallylbenzene
allylbenzaldehyde
2-allylthiophene
diallylmesitylene
3-phenylbutyraldehyde
3-(3,4-dimethylphenyl)propionaldehyde
3-(3,4-dichlorophenyl)propionaldehyde
3-(3-formylphenyl)-2-methylpropionaldehyde
1-phenyl-3-butanone
1-phenyl-3-pentanone
1-(3-carbomethoxyphenyl)-3-pentanone
1-(3,4-dichloro-5-nitrophenyl)-3-pentanone
2-phenyl-4-pentanone
3-phenylcyclohexanone
2-methyl-4-phenyl-3-buten-2-ol
2-phenethyl chloride
2-phenethyl bromide
1-phenyl-2-propylchloride
2-naphthylethylchloride
p-(2-chloroethyl(benzoic acid
2-thienylethylchloride
2-chloro-3-phenylpropionaldehyde
2-(p-diethylaminophenyl)ethylchloride
p-nitrophenylethylchloride
7-p-carboxyphenyl-2-chloro[2.2.1]bicycloheptane
1-phenyl-2-chloro-3-butanone
7-phenyl-2-chloro[2.2.1]bicycloheptane
2-chloroethylmesitylene
2,4-bis(2-chloroethyl)mesitylene.

Products of this invention are commercial products and analogs of commercial products, and are useful in the prefumery art, the polymer art, the pharmaceutical art and agricultural art in some cases without change and in others after subjecting to well-known reactions commonly used in these arts for the production of useful products.

The following examples illustrate various ramifications of this invention, but the invention is not to be limited thereby.

EXAMPLE 1

Into a glass pressure chamber was injected 150 ml. ethylene gas at about 25° C. and 20 ml. of a 0.1 molar solution of LiPdCl$_3$ in acetonitrile was added by injection. In acetonitrile, LiPdCl$_3$ appears to form rather than Li$_2$PdCl$_4$. More ethylene was injected at 24° C. to a pressure of 45 p.s.i.g. To the resulting solution was added with agitation 5 ml. of 0.4 molar solution of diphenyl-1 hour at 24° C., a sample of the acetonitrile solution was withdrawn from the system and analyzed by gas chromatography. It analyzed 0.1 molar in styrene. This calculated to be a 62.5% yield, based on diphenylmercury used, assuming that both phenyl groups can react. However, this would be over 100%, based on palladium, unless it is assumed that the palladium is prevented from being completely reduced to the metal by an oxidizing agent such as ethylene or mercuric chloride. For instance, [PdHCl], the eliminated metal compound can be oxidized to PdCl$_2$ by giving up hydrogen to ethylene or to HgCl$_2$ by the following reactions:

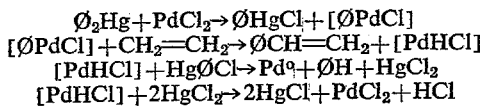

EXAMPLE 2

When propylene was substituted for ethylene in Example 1, the product was a solution of acetonitrile 0.075 molar in transpropenyl benzene and 0.015 molar in cis-propenyl benzene, corresponding to a yield 56.4% of theory.

EXAMPLE 3

A mixture of 0.35 gram diphenylmercury, 1.68 grams acrolein, and 10 ml. of a 0.1 molar solution of LiPdCl$_3$ in acetonitrile was stirred for 16 hours at 24° C. A sample analyzed by gas chromatography showed the acetonitrile solution to be 0.1 molar in cinnamaldehyde. This corresponds to 60% of theoretical. The cinnamaldehyde was identified as the 2,4 - dinitrophenylhydrazone, M.P. 249–250° C. (255° C. reported in the literature).

EXAMPLE 4

A mixture of 0.35 gram diphenylmercury, 1.6 grams methyl vinyl ketone, and 20 ml. of 0.1 molar LiPdCl$_3$ in acetonitrile was stirred 16 hours at 24° C. A sample analyzed by gas chromatography showed the resulting solution to be 0.07 molar in benzalacetone. The benzalacetone was characterized as the 2,4-dinitrophenylhydrazone, M.P. 221.5–222° C. (223° C. reported in the literature).

EXAMPLE 5

A mixture of 0.93 gram phenylmercuric chloride, 3 ml. 1.0 molar solution of methyl acrylate in acetonitrile and 10 ml. 0.1 molar LiPdCl$_3$ in acetonitrile was stirred 16 hours at 24° C. A sample analyzed by gas chromatography showed the resulting solution to be 0.153 molar in methyl cinnamate. This was a 100% of theoretical yield, based on palladium.

EXAMPLE 6

To a mixture of 32 grams anhydrous cupric chloride, 19.5 grams methyl acrylate, 62 grams phenylmercuric chloride, and 160 ml. methanol was added 20 ml. of 0.1 molar Li$_2$PdCl$_4$ in methanol with cooling so as to maintain a temperature between 24 and 40° C. After 2 hours, the reaction was complete. The solvent was removed at reduced pressure and replaced by equal parts of ether and water, and filtered to remove insoluble material. The aqueous phase was washed with five portions of ether and all ether extracts were combined with the ether phase. The ether phase, after drying, was distilled to obtain 18.5 grams methyl cinnamate, B.P. 119–137° C./8 mm. which crystallized readily and melted at 33° C. This corresponded to 57% of theoretical yield. The purity was 99%.

EXAMPLE 7

To a mixture of 32 grams anhydrous cupric chloride, 19.5 grams methyl crotonate, 62 grams phenylmercuric chloride and 160 ml. methanol was added 20 ml. of 0.1 molar Li$_2$PdCl$_4$ in methanol, with cooling so as to maintain a temperature between 24° C. and 40° C. After 24 hours at 24° C., the solvent was distilled off in vacuo and methylene chloride substituted. The insoluble material was removed and the methylene chloride solution of the product was washed with water and dried. This solution was distilled to recover the product, B.P. 110–135° C./5 mm., which weighed 10 grams. The product was fractionated by gas chromatography. The main fraction amounting to 60% of the product was shown by carbon-hydrogen analysis and nuclear magnetic resonance spectrum to be methyl 3-phenyl-2-butenoate. The yield of this product was 24% of theory. It analyzed 74.53% C, 7.02% H and the N.M.R. spectrum at 60 mc. in deuterochloroform showed: 2 singlets of relative area 3 at −142 cps., a singlet of relative area 3 at −204 cps., a narrow quartet of relative area 1 at −354 cps., and a multiplet of relative area 5 at −424 cps. with respect to tetramethylsilane as an external standard. The data indicate phenyl and carbomethoxy are cis to each other.

EXAMPLE 8

To a mixture of 32 grams anhydrous cupric chloride, 18.7 grams methyl methacrylate, 62 grams phenylmercuric chloride and 160 ml. methanol was added 20 ml. of 0.1 molar Li$_2$PdCl$_4$ in methanol, with cooling so as to maintain a temperature between 24° C. and 40° C. After 24 hours, the reaction was complete. The solvent was removed at reduced pressure and replaced by equal parts of pentane and water and filtered to remove insoluble material. The aqueous phase was washed with five portions of pentane and all pentane extracts were combined with the pentane phase. The pentane phase, after drying, was distilled to obtain 17 grams of product, B.P. 108–140° C./5 mm. as a colorless liquid. This liquid was fractionated by gas chromatography and 70% was obtained as the major product. It crystallized from pentane at Dry Ice temperature as crystals, M.P. 36–37° C. This analyzed 74.46% C, 6.91% H, and was shown by infrared to contain a carbonyl group and a C—C double bond, clearly indicating the product to be methyl 2-methyl cinnamate. The yield was about 35% of theory. The N.M.R. spectrum in deuterochloroform solution at 60 mc. had bands at −107 cps. (narrow doublet of relative area 3), −209 cps. (singlet of relative area 3 or 4), and at −422 cps. (single relative area area 5), with respect to tetramethylsilane as an external standard.

EXAMPLE 9

Into a pressure bottle was introduced 0.7 gram p-chloromercuri)anisole and propylene gas at about 24° C., with air displacement first at atmospheric pressure and then at 50 p.s.i.g. Then 20 ml. of 0.1 molar LiPdCl$_3$ in acetonitrile was intrdouced while stirring. After 3 hours of agitation, a sample was analyzed by gas chromatography, which showed a 4% yield of cis-anethole and a 21% yield of trans-anethole.

EXAMPLE 10

A mixture of 3.6 g. (10 mmoles) of p-chloromercuribenzoic acid, 2.68 g. (20 mmoles) cupric chloride, 0.42 g. (10 mmoles) lithium chloride, 1 g. water, 7 g. acetic acid, 0.8 g. methyl vinyl ketone and 1.0 ml. 0.1 molar $Li_2PdCl_4$ in acetic acid was stirred at 24° C. for 16 hours and the product was extracted with methylene chloride. The 1-p-carboxyphenyl-2-chloro-3-butanone thus isolated was a solid amounting to 0.64 g. which after crystallization from a benezne-hexane mixture melted at 133–133.5 and analyzed 58.81% C., 5.36% H. and 15.8% Cl.

EXAMPLE 11

A mixture of 0.21 gram of ruthenium trichloride, 0.31 gram phenylmercuric chloride, and 0.48 gram methyl acrylate in 9 ml. methanol was heated at 45° C. for 16 hours. Gas chromatography showed at the end of that time that the resulting mixture was 0.025 molar in methyl cinnamate. This is a yield of about 20% of theory.

EXAMPLE 12

A mixture of 0.26 gram of rhodium trichloride trihydrate, 0.31 gram phenylmercuric chloride, and 0.48 gram methyl acrylate in 9 ml. methanol was heated at 24° C. for 24 hours. Gas chromatography showed at the end of that time that the resulting mixture was 0.059 molar in methyl cinnamate. This is a yield of about 57% of theory.

EXAMPLE 13

Using the procedure of Example 10 there was obtained from the reaction of phenylmercuric chloride and norbornene a 5.7% yield of 7-phenyl-2-chloro-2:2:1-bicycloheptane (probably) as a colorless solid, M.P. 47.5–48° C.

EXAMPLE 14

Using the procedure of Example 10 there was obtained from the reaction of chloromercurimesitylene and ethylene at 30 p.s.i. (40° C.) a 1.9% yield of 2-chloroethyl-mesitylene, M.P. 56–56.5° C.

EXAMPLE 15

A mixture of 4.9 grams 3,5-bis(acetoxymercuri)salicylaldehyde, 14.3 grams methyl acrylate and 160 ml. of 0.1 molar solution of $Li_2PdCl_4$ in methanol was stirred for 16 hours at 24° C. The palladium metal powder, which precipitated, was separated and the sovlent evaporated. The residue was taken up in methylene chloride to remove insoluble salts and this solvent was evaporated. The residue was then crystallized from absolute alcohol. There was obtained 0.274 gram of crystalline dimethyl salicylaldehyde-3,5-bis(3-acrylate), M.P. 193–195° C. In chloroform solution, this compound showed an ester carbonyl absorption band at 1715 cm.$^{-1}$, an aldehyde carbonyl band at 1665 cm.$^{-1}$, and a double bond absorption band at 1640 cm.$^{-1}$. The carbon-hydrogen analysis showed 62.04% C., 5.14% H. The N.M.R. spectrum in deuterochloroform showed bands at −235 cps. (two singlets of relative area 6), −416, −432, −488, −506 cps. (all doublets of relative area 1 each), −517 and −524 cps. (both doublets of total relative area 2), and −648 cps. (singlet of relative area 1).

EXAMPLE 16

In a reaction flask was placed 62 grams phenylmercuric chloride, 19.1 grams of methyl acrylate, 20 grams of sodium chloride, 2.0 grams cupric chloride, 120 ml. methanol and 40 ml. of 0.1 molar $Li_2PdCl_4$ in methanol. This solution was stirred at 40° C. while passing oxygen into the solution. At 15-minute intervals, 10 ml. portions of 3 molar hydrogen chloride in methanol were added until 50 ml. total had been added, and then two more portions were added one hour apart. After standing 16 hours at 24° C., the solvent was removed in vacuo and the residue was diluted with water and extracted with pentane. The pentane solution, after washing with water and drying, yielded on evaporation 22.4 grams of product, boiling at 110–113° C./6 mm. This product analyzed 86% methyl cinnamate (60% of theory), and 14% methyl 2-methoxy-3-phenylpropionate, and the two compounds were separated by gas chromatography.

EXAMPLE 17

To a mixture of 1.6 grams anhydrous cupric chloride, 2.8 grams bis-(2-naphthyl)mercury, 0.84 gram acrolein, and 8 ml. methnaol was added 1 ml. of 0.1 molar $Li_2PdCl_4$ in methanol at a temperature of about 24° C. After 72 hours, the reaction was converted into the 2,4-dinitrophenylhydrazone, M.P. 268–268.5° C., weighing 0.36 gram. This was 8% of theoretical yield of 3-(2-naphthyl) acrolein.

EXAMPLE 18

A mixture of 4.4 grams ferric nitrate monohydrate, 3.1 grams diphenylmercury, 0.95 gram methyl acrylate, 8 ml. methanol, and 1.0 ml. 0.1 molar $Li_2PdCl_4$ in methanol was stirred 16 hours at 24° C. After this period, the solution was analyzed by gas chromatography. Analysis showed the product to be 0.327 molar in methyl cinnamate, which is a yield of 33% of theory.

EXAMPLE 19

A mixture of 1.92 grams thallium triacetate, 3.1 grams diphenylmercury, 0.95 gram methyl acrylate, 8 ml. methanol and 1.0 ml. 0.1 molar $Li_2PdCl_4$ in methanol was stirred 16 hours at 24° C. After this period, the solution was analyzed by gas chromatography. Analysis showed the product to be 0.364 molar in methyl cinnamate, which is a yield of 36% of theory.

EXAMPLE 20

A reaction mixture of 1.81 grams 2-naphthylmercuric chloride, 4 grams acrylonitrile and 50 ml. 0.1 molar $Li_2PdCl_4$ in methanol solution was stirred at 24° C. for 16 hours. The methanol solution was filtered, diluted to incipient cloudiness with water and allowed to crystallize. Crystals M.P. 143.8–144.6° C. amounting to 0.32 gram were obtained as 3-(2-naphthyl)acrylonitrile product. This amounts to 30% of theory. The 3-(2-naphthyl) acrylonitrile is characterized by infrared spectrum, which shows a nitrile band at 2015 cm.$^{-1}$ and a double bond absorption at 1612 cm.$^{-1}$. Carbon-hydrogen analysis showed 86.9% C., 5.34% H.

EXAMPLE 21

A reaction mixture of 0.427 gram tetraphenyl tin, 0.95 gram methyl acrylate and 10 ml. 0.1 molar $Li_2PdCl_4$ in methyl alcohol was stirred at 40° C. for 3 hours. Gas chromatography showed the solution produced to be 0.094 molar in methyl cinnamate. This corresponds to a yield of 52% of theory.

EXAMPLE 22

A reaction mixture of 3.13 grams phenylmercuric chloride, 0.92 gram ethyl acrylate, 1.34 grams cupric chloride, 8 ml. 95% ethyl alcohol, and 1.0 ml. 0.01 molar $Li_2PdCl_4$ in 95% ethyl alcohol was stirred at 60° C. for 2 hours. Gas chromatography showed the solution produced to be 0.415 molar in ethyl cinnamate. This corresponds to a yield of 42% of theory.

EXAMPLE 23

A reaction mixture of 0.52 gram tetraphenyl lead, 0.95 gram methyl acrylate and 10 ml. 0.1 molar $Li_2PdCl_4$ in methyl alcohol was stirred at 24° C. for 16 hours. Gas chromatography showed the solution produced to be 0.164 molar in methyl cinnamate. This corresponds to a yield of 62% of theory.

EXAMPLE 24

In a reaction flask was placed 2.3 grams bis-2-naphthyl mercury, 0.95 gram methyl acrylate and 100 ml. of a 0.1 molar $Li_2PdCl_4$ in methanol. This solution was stirred for about 16 hours at about 24° C., filtered and then evaporated. The residue was crystallized from aqueous methanol to obtain 0.8 gram crystalline plates, M.P. 91.6–92.2° C. This was shown by carbon-hydrogen analysis (79.14% C, 5.84% H) to be methyl 3-(2-naphthyl)acrylate. This is confirmed by infrared spectrum in chloroform where a carbonyl band at 1710 cm.$^{-1}$ and a double bond at 1640 cm.$^{-1}$ appeared. The yield was 35% of theory.

EXAMPLE 25

A mixture of 17.3 grams mesitylene, 64 grams mercuric aceate, 100 ml. methanol and 1.0 ml. 70% perchloric acid was refluxed for 1 hr. at 65° C. After cooling, 2 grams sodium acetate was added to reduce the acidity and the solution was cooled to about −80° C. The crystalline solids were separated, taken up in 300 ml. of chloroform. This solution was filtered and diluted with pentane to precipitate 19 grams 2,4-bis(acetoxymercuri)mesitylene, M.P. 224–225° C., which analyzed 60.3% Hg.

A mixture of 3.26 grams of the above 2,4-bis(acetoxymercuri)mesitylene, 4.8 grams methyl acrylate and 100 ml. 0.1 molar LiPdCl$_3$ in acetonitrile was stirred 16 hours at 24° C. The reaction mixture was filtered to seperate precipitated palladium and the solvent was removed under reduced pressure. The residue crystallized from methanol diluted with water as colorless plates, M.P. 129–129.5° C., amounting to 0.2 gram. This was shown by analysis to be dimethyl mesitylene - 2,4 - bis(3-acrylate), the carbon-hydrogen analysis being 70.5% C, 7.27% H.

EXAMPLE 26

A mixture of 3.1 grams phenylmercuric chloride, 1.62 grams ferric chloride, 0.26 gram rhodium trichloride, 0.95 gram methyl acrylate and 9 ml. methanol was stirred 16 hours at 24° C. Gas chromatography on the resulting mixture showed it to be 0.318 molar in methyl cinnamate. This was a yield of 32% of theory.

EXAMPLE 27

A mixture of 0.71 gram p-chloromercuri-N,N-diethylaniline, 0.95 gram methyl acrylate and 20 ml. 0.1 molar Li$_2$PdCl$_4$ in methanol was stirred 16 hours at 24° C. The precipitated metal was removed and, after removing methanol, the residue was taken up in pentane from which methyl p-diethylaminocinnamate, M.P. 41.8–42.2° C., crystallized out at −40° C. This product was characterized by infrared as having a carbonyl group and a double bond. The carbon-hydrogen analysis showed 72.02% C, 8.62% H. The yield was 22% of theory.

EXAMPLE 28

A mixture of 3.2 grams mercuric acetate, 0.23 gram palladium acetate, 8 grams acetic acid, 0.935 gram diethylaniline and 0.95 gram methyl acrylate was stirred for 16 hours at 24° C. The resulting reaction mixture was filtered, freed of solvent, taken up in pentane and crystallized at −80° C. to obtain 0.16 gram crude methyl p-diethylaminocinnamate, M.P. 38–39° C. The yield was 14% of theory.

EXAMPLE 29

A mixture of 2 grams anisole, 7 grams acetic acid, 0.95 gram methyl acrylate, 1.6 grams mercuric acetate and 1 ml. 0.01 molar palladium acetate in acetic acid was stirred 48 hours at 24° C. Gas chromatography showed that the solution was 0.2 molar in methyl p-methoxycinnamate. This is 88% of theory. The product was isolated, crystallized from pentane and further characterized by its melting point of 89–90° C., the presence of a carbonyl and a double bond as shown by infrared analysis and its carbon-hydrogen analysis, which showed 68.25% C and 6.39% H.

EXAMPLE 30

A mixture of 1.0 ml. 1.0 molar tetramethyl tin in methanol, 0.95 gram methyl acrylate and 10 ml. 0.1 molar Li$_2$PdCl$_4$ in methanol was stirred 16 hours at 24° C. Gas chromatography showed that the solution was 0.048 molar in methyl crotonate. This was 57% of theoretical.

EXAMPLE 31

A mixture of 0.25 gram methyl mercuric chloride in 1 ml. methanol, 0.95 gram methyl acrylate and 10 ml. 0.1 molar Li$_2$PdCl$_4$ in methanol was stirred 24 hours at 24° C. Gas chromatography showed that the solution was 0.013 molar in methyl crotonate. This was 16% of theoretical.

EXAMPLE 32

A mixture of 1.0 ml. 1.0 molar tetramethyl lead in methanol, 0.95 gram methyl acrylate and 10 ml. 0.1 molar Li$_2$PdCl$_4$ in methanol was stirred 24 hours at 24° C. Gas chromatography showed that the solution was 0.093 molar in methyl crotonate. This was 112% of theoretical, based on one methyl of tetramethyl lead for the reaction.

EXAMPLE 33

A mixture of 1.79 grams chloromercurinitrobenzene (89% m-isomer), 4.75 grams methyl acrylate and 50 ml. 0.1 molar Li$_2$PdCl$_4$ in methanol was stirred 3 hours at 24° C. The resulting solution was filtered and evaporated and the product was crystallized from aqueous methanol to obtain 0.259 gram of needles, M.P. 121–122° C., of methyl m-nitrocinnamate, the M.P. of which is reported to be 123–124° C. The yield was 25% of theory.

EXAMPLE 34

A mixture of 3.7 grams 2-chloromercurithiophene, 9.53 grams methyl acrylate and 100 ml. of 0.1 molar Li$_2$PdCl$_4$ in methanol was stirred 48 hours at 24° C. After filtering, removing solvent under reduced pressure and extracting the product with hexane, the product was crystallized from the hexane at −40° C. There was obtained 0.85 gram methyl 3-(2-thienyl) acrylate, M.P. 40–40.2° C., the structure of which was verified by infrared, which showed bands of the carbonyl and of a double bond, and by carbon-hydrogen analysis, which showed 57.25% C and 5.00% H. The yield was 36% of theory.

EXAMPLE 35

A mixture of 0.25 gram methylmercuric chloride, 0.91 gram styrene and 10 ml. of 0.1 molar Li$_2$PdCl$_4$ in methanol was stirred 16 hours at 24° C. Gas chromatography showed that the solution was 0.068 molar in trans-propenyl benzene and that the yield was 75% of theory.

EXAMPLE 36

A mixture of 1.0 ml. of 1 molar tetramethyl tin in methanol, 0.91 gram styrene, and 10 ml. of 0.1 molar Li$_2$PdCl$_4$ in methanol was stirred 16 hours at 24° C. Gas chromatography showed that the solution was 0.01 molar in allylbenzene and 0.136 molar in trans-propenylbenzene and that the yield was 95% of theoretical in the latter.

EXAMPLE 37

A mixture of 1.0 ml. of 1 molar tetramethyl lead in methanol, 0.91 gram styrene and 10 ml. of 0.1 molar Li$_2$PdCl$_4$ in methanol was stirred 24 hours at 24° C. Gas chromatography showed that the solution was 0.192 molar in trans-propenylbenzene and that the yield was 108% of theory, based on one methyl group of the tetramethyl lead reaction.

EXAMPLE 38

A mixture of 3.94 grams p-acetoxymercuriacetanilide, 4.8 grams methyl acrylate and 100 ml. 0.1 molar Li$_2$PdCl$_4$ in methanol was stirred at 24° C. for 16 hours.

The reaction mixture was freed of solvent, dissolved in methylene chloride and chromatographed on alumina. The eluate was crystallized from methanol to obtain 0.095 gram yellow crystals, M.P. 193–194° C., the infrared spectrum of which showed a carbonyl and a double bond and an NH group. The carbon-hydrogen analysis was 65.41% C., 6.2% H, corresponding to methyl p-acetamidocinnamate. The yield was 5% of theory.

EXAMPLE 39

A mixture of 3.29 grams o-chloromercuriphenol, 9.5 grams methyl acrylate and 100 ml. 0.1 molar $Li_2PdCl_4$ in methanol was stirred at 24° C. for 16 hours. The reaction mixture was freed of solvent, dissolved in hexane and crystallized from hexane to obtain 0.061 gram colorless crystals, M.P. 136–137° C., the infrared spectrum of which showed a carbonyl and a double bond, corresponding to methyl o-hydroxycinnamate. The yield was 3.5% of theory.

EXAMPLE 40

A mixture of 5.5 grams mercuric oxide dissolved in 250 ml. of 60% (by weight) perchloric acid and 13.0 grams o-dichlorobenzene was stirred at 24° C. for 48 hours and poured into 1 liter of an aqueous 5% sodium chloride solution. The oily product was separated, washed with water, and dissolved in acetone from which 2.9 grams of crude 3,4-dichlorophenylmercuric chloride, M.P. 206–207° C., separated on addition of water.

A mixture of 2.9 grams 3,4-dichlorophenylmercuric chloride, 9.5 grams methyl acrylate, and 100 ml. 0.1 molar $Li_2PdCl_4$ in methanol was stirred 16 hours at 24° C. The reaction mixture was filtered, concentrated under reduced pressure, and dissolved in hot hexane. From this hexane solution at −5° C., colorless crystals, M.P. 117–118° C., separated, amounting to 0.68 gram. This crystalline product was shown by infrared to contain a carbonyl and a double bond. It analyzed 51.95% C, 3.82% H, and gave 3,4-dichlorocinnamic acid on saponification and this was methyl 3,4-dichlorocinnamate. Yield was 38.5% of theory.

EXAMPLE 41

A mixture of 5.5 grams mercuric oxide dissolved in 250 ml. of 60% perchloric acid and 10.0 grams benzoic acid was stirred at 24° C. for 16 hours and poured into a 1 liter aqueous 5% sodium chloride solution. The solid product was separated, washed with water and dissolved in acetone, from which 5.9 grams of crude m-chloromercuribenzoic acid, M.P. 257–259° C., separated on addition of water.

A mixture of 2.5 grams m-chloromercuribenzoic acid, 6.7 grams methyl acrylate and 70 ml. 0.1 molar $Li_2PdCl_4$ in methanol was stirred 2 hours at 24° C., and then for 2 hours at 80° C. in a closed vessel. The reaction mixture was filtered, concentrated under reduced pressure and dissolved in hot hexane. From this hexane solution separated colorless crystals, M.P. 79–80° C., amounting to 0.83 gram. This crystalline product was shown by infrared to contain a carbonyl and a double bond. It analyzed 65.17% C, 5.45% H, and gave m-carboxycinnamic acid, M.P. 274.8–275.6° C., on saponification and this was methyl m-carbomethoxycinnamate. Yield was 54% of theory.

EXAMPLE 42

A mixture of 5.5 grams mercuric oxide dissolved in 250 ml. of 60% by weight perchloric acid and 10.5 grams benzaldehyde was stirred for 3 hours at 24° C. and poured into 1 liter of 5% aqueous sodium chloride solution to obtain 6.5 grams of m-chloromercuribenzaldehyde, M.P. 189–191° C., which was dried.

A mixture of 3.41 grams m-chloromercuribenzaldehyde, 9.5 grams methyl acrylate and 100 ml. of 0.1 molar $Li_2PdCl_4$ in methanol was stirred 16 hours at 24° C. The reaction mixture was filtered, freed of solvent, and dissolved in hot hexane and recovered as an oil by distilling off the hexane. The oil was methyl m-formylcinnamate, which was characterized by forming its 2,4-dinitrophenylhydrazone, M.P. 221–222° C., which analyzed 55.13% C, 3.81% H, 15.13% N. The yield was 3% of theory.

EXAMPLE 43

To a mixture of 1.6 grams anhydrous cupric chloride, 3.6 grams p-chloromercuribenzoic acid, 0.95 gram methyl acrylate and 8 ml. methanol was added 1.0 ml. of 0.1 molar $Li_2PdCl_4$ in methanol at a temperature of 24° C. for 48 hours and 75° C. for 30 minutes. After the reaction was complete, the solution was filtered and the solvent was removed at reduced pressure, and the product was crystallized first from hexane and then from methanol. The yield was 0.51 gram methyl p-carbomethoxycinnamate, M.P. 125.8–126.2° C., which analyzed 65.71% C and 5.91% H and was shown by infrared to contain a carbonyl group and a double bond. The yield was 20% of theory.

EXAMPLE 44

A mixture of 11 grams mercuric oxide dissolved in 500 ml. of 60% by weight perchloric acid and 20 grams benzophenone was stirred for 48 hours at 24° C. and poured into 2 liters of 2.5% aqueous sodium chloride solution to obtain 4.47 grams of crude 3-chloromercuribenzophenone, M.P. 251–252° C., which contained some 3,3′-bis(chloromercuri)benzophenone.

A mixture of 4.18 grams of this crude chloromercuribenzophenone, 9.5 grams methyl acrylate and 100 ml. of 0.1 molar $Li_2PdCl_4$ in methanol was stirred 3 hours at 24° C. The reaction mixture was filtered, freed of solvent, chromatographed on alumina and recovered as an oil, which crystallized from methanol. The crystals, M.P. 113–114° C., amounting to 0.95 gram, were dimethyl 3,3′-benzophenone-bis(acrylate) and the yield was 3.5% of theory. The oil was methyl 3-benzoylphenylacrylate.

EXAMPLE 45

A mixture of 32 grams mercuric acetate, 0.0023 gram palladium nitrate, 35 grams benzene, and 3.8 grams methyl acrylate was heated in a pressure bottle in a nitrogen atmosphere at 125° C. for 4 hours. The reaction mixture was shown to be 0.71 molar in methyl cinnamate. This is 63% of theoretical yield. The product was dissolved in pentane, freed of insoluble matter and distilled under reduced pressure to obtain 3.9 grams methyl cinnamate, boiling at 104–107° C./4 mm.

EXAMPLE 46

A mixture of 0.34 gram diphenyl tin dichloride, 0.95 gram methyl acrylate and 10 ml. 0.1 molar $Li_2PdCl_4$ in methanol was stirred at 24° C. for 16 hours. The reaction mixture was shown to be 0.152 molar in methyl cinnamate, which is 75% of theory, based on 2 moles of product from 1 mole of diphenyl tin dichloride.

EXAMPLE 47

To a mixture of 0.48 gram methyl acrylate and 10 ml. 0.1 molar $LiPdCl_3$ in acetonitrile solution, cooled to about −40° C. and under a dry nitrogen atmosphere was added 1.0 ml. of a 1.0 molar solution of phenyl magnesium bromide in tetrahydrofuran solution. This mixture was allowed to gradually warm up to 24° C. over a 16-hour period. By chromatographic analysis, the resulting solution was shown to be 0.0067 molar in methyl cinnamate. This was 8% of theory.

EXAMPLE 48

Using the procedure of Example 10 there was obtained from the reaction of bis(acetoxymercuri)mesitylene and ethylene at 30 p.s.i. (24° C. for 16 hours and 50° C. for 2 hours) an 0.8% yield of 2,4-bis(2-chloroethyl)mesitylene, M.P. 115.5–116.5° C. by gas chromatography the presence of traces of mono-2-chloroethylmesitylene was detected.

EXAMPLE 49

A mixture of 30 millimoles p-chloromercuridiphenyl and 4.77 grams methyl acrylate was reacted in 30 ml. methanol with 30 mmoles PdCl$_2$ and 60 mmoles LiCl$_2$ at 24° C. for 16 hours. A 2% of theoretical yield of methyl p-phenylcinnamate, M.P. 144.5–145.5° C. was isolated. The M.P. was 147–147.5° C. after purifying.

EXAMPLE 50

A mixture of 10 millimoles of 2-naphthylmercuric chloride and 3 grams allylbenzene was reacted with 110 ml. 0.1 molar Li$_2$PdCl$_4$ in methanol at 24° C. for 16 hours. The product was 1- or 2 - (2 - naphthyl) - 3 - phenyl-1-propane, M.P. 147.6–148.0° C.

EXAMPLE 51

A mixture of 10 millimoles of 4-chloromercuri-2-nitroanisole and 2 grams methyl acrylate was reacted with 110 ml. 0.1 molar Li$_2$PdCl$_4$ in methanol at 24° C. for 16 hours. A 17% yield of methyl 3 - nitro-4-methoxycinnamate, M.P. 130–130.2° C., was isolated from the reaction mixture.

EXAMPLE 52

A mixture of 10 millimoles of chloromercuribenzoic acid and about 10 grams styrene was reacted with 100 ml. 0.1 molar Li$_2$PdCl$_4$ in methanol at 24° C. for 16 hours. From this reaction mixture was recovered a 36% of theoretical yield of 3-carbomethoxystilbene, M.P. 159.2–159.6° C.

EXAMPLE 53

A mixture of 10 millimoles 2-chloromercurinaphthalene and 2.71 grams styrene was reacted with 110 ml. 0.1 molar Li$_2$PdCl$_4$ in methanol at 24° C. for 16 hours. The reaction mixture was filtered, evaporated, and crystallized from hexane. There was obtained 1.4 grams trans-2-naphthyl-1-phenylethylene, M.P. 157–158° C. The yield was 61% of theory.

EXAMPLE 54

A mixture of 10 millimoles of 2 - chloromercurinaphthalene and 2.7 grams α-methyl styrene was reacted with 110 ml. 0.1 molar Li$_2$PdCl$_4$ in methanol at 24° C. for 16 hours. The reaction mixture was filtered, evaporated, and crystallized from hexane. There was obtained 0.85 gram 1-(2-naphthyl)-2-phenyl-1-propene, M.P. 108° C. The yield was 35% of theory.

EXAMPLE 55

A mixture of 10 millimoles of chloromercuribenzene and 2.7 grams propenylbenzene was reacted with 110 ml. 0.1 molar Li$_2$PdCl$_4$ in methanol at 24° C. for 16 hours. A 21% yield of 1,2-diphenylpropene, M.P. 88.4–88.8° C., was isolated from the reaction mixture.

EXAMPLE 56

A mixture of 10 millimoles of phenylmercuric chloride and 3 grams anethole was reacted with 110 ml. 0.1 molar Li$_2$PdCl$_4$ in methanol at 24° C. for 16 hours. A yield of about 20% 1 - p-anisyl-2-phenylpropene, melting at 186–186.4° C., was isolated from the reaction mixture.

EXAMPLE 57

A mixture of 2 grams anisole and 0.97 gram methyl acrylate was mixed with 10 millimoles mercuric nitrate and 0.1 millimole palladium nitrate in 7 ml. acetic acid at 24° C. for 24 hours. Analysis showed the production of a 28% yield of methyl p-methoxycinnamate.

EXAMPLE 58

A mixture of 10 millimoles anisylmercuric chloride, 110 ml. 0.1 molar Li$_2$PdCl$_4$ in methanol and 2.7 grams propenylbenzene was reacted at 24° C. for 16 hours. 1-phenyl-2-anisylpropene was obtained from the reaction mixture.

EXAMPLE 59

A mixture of 1.0 ml. 1.0 molar phenyltin trichloride in acetonitrile, and 10 ml. 0.1 Li$_2$PdCl$_4$ in methanol was placed in a 250 ml. pressure bottle and 0.85 gram methyl acrylate was added. This was stirred for 24 hours at 24° C. The resulting mixture yielded methyl cinnamate in 77% yield.

EXAMPLE 60

A mixture of 3.5 grams bis-triphenyl phosphine palladium dichloride (5 mmoles), 1.8 grams diphenylmercury (5 mmoles), 3 ml. methyl acrylate and 50 ml. acetonitrile were mixed and stirred for 16 hours at 24° C. The resulting product contained 2 mmoles methyl cinnamate, as shown by gas chromatography.

EXAMPLE 61

A mixture of 1millimole phenyl mercuric cyanide, 10 ml. 0.1 molar Li$_2$PdCl$_4$ in methanol, and 0.98 gram methyl acrylate was stirred for 24 hours at 24° C. Methyl cinnamate was obtained in 85% of theoretical yield.

EXAMPLE 62

A mixture of 1.1 g. (2.5 mmoles) tetraphenyl tin, 2.68 g. (20 mmoles) cupric chloride, 0.42 g. (10 mmoles) lithium chloride, 7 g. acetic acid, 1 g. water and 1 ml. 0.1 molar Li$_2$PdCl$_4$ in acetic acid was stirred 48 hours at 24° C. under 30 p.s.i. of ethylene and phenethyl chloride was recovered in quantitative yield.

EXAMPLE 63

A mixture of 0.32 gram carbomethoxymercuric acetate, 0.91 gram styrene, and 10 ml. 0.1 molar Li$_2$PdCl$_4$ in methanol solution was stirred at 24° C. for 72 hours. Gas chromatographic analysis showed the resulting solution to be 0.028 molar in methyl cinnamate. This is 33% of theoretical yield.

EXAMPLE 64

A mixture of 0.3 gram carbomethoxymercuric chloride and 10 ml. 0.1 molar LiPdCl$_3$ in acetonitrile solution was stirred with propylene under 30 p.s.i. propylene pressure at 24° C. for 72 hours. Gas chromatographic analysis showed the resulting solution to be 0.016 molar in methyl crotonate. This is 16% of theoretical yield.

EXAMPLE 65

A mixture of 0.348 gram carboethoxymercuric acetate and 10 ml. 0.1 molar LiPdCl$_3$ in acetonitrile solution was stirred with ethylene under 30 p.s.i. ethylene pressure at 24° C. for 72 hours. Gas chromatographic analysis showed the resulting solution to be 0.05 molar in ethyl acrylate. This was 50% of theoretical yield.

EXAMPLE 66

A mixture of 0.332 gram carboethoxymercuric acetate and 10 ml. 0.1 molar Li$_2$PdCl$_4$ in ethanol solution was stirred with 0.91 gram styrene at 24° C. for 16 hours. Gas chromatographic analysis showed the resulting solution to be 0.013 molar in ethyl cinnamate. This is a yield of 13% of theory.

EXAMPLE 67

A mixture of 0.295 gram carbomethoxymercuric chloride and 10 ml. 0.1 molar Li$_2$PdCl$_4$ in methanol was stirred at 24° C. for 16 hours under 30 p.s.i. ethylene pressure. The reaction mixture was shown to be 0.050 molar in methyl acrylate, which is 50% of theory.

Examples 63–67 are directed to a particularly interesting carboalkoxylation process wherein the organo group is a carboalkoxy group. By reacting a carboalkoxymercury compound with an olefin in the presence of a palladium salt, a carboxylic ester group is substituted for one of the ethylenic hydrogen atoms. The carboalkoxylation process preferably uses mercury as the M metal and palladium as the M′ metal. Mercuric acetate reacts readily with carbon monoxide and an aliphatic alcohol to produce the carboalkoxymercury compound which has the formula

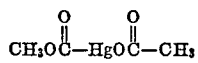

when the alcohol is methanol. Mercuric chloride does not react readily in a similar manner but the carboalkoxymercuric acetate will react with NaCl to produce carboalkoxymercuric chloride and this latter compound will react with olefins in the presence of $PdCl_2$ in accordance with this invention.

In the carboalkoxylation of olefins in accordance with this invention, the olefins which undergo the reaction are the same as those broadly described hereinbefore and broadly include any olefin having one hydrogen on an ethylenic carbon. The olefins which undergo the reaction of most interest are ethylene and substituted ethylenes having one unsubstituted hydrogen on the ethylenic carbon. The substituting groups, i.e., the R groups of

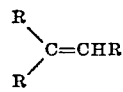

may be organic and inorganic groups of various kinds as set forth hereinabove. This includes aliphatic, aromatic and alicyclic hydrocarbon groups and the halo, nitro, highly substituted amino, hydroxy, carboxy and carboalkoxy derivatives thereof. There may be hydroxy, ester, aldehyde, ketone, carboxylic acid, halide, nitro, or nitroether or amide groups in the substituted ethylene, and these groups may either be an R group itself or they may be substituents on an organic R group.

The carboalkoxylation process of this invention is particularly suitable for the production of $\alpha,\beta$-unsaturated esters, e.g., methyl acrylate from ethylene and methyl crotonate from propylene.

In the preferred carboalkoxylation process, the carboalkoxymercury salt, chloride or acetate, is prepared in the absence of ethylene as a first step, and then the palladium salt and ethylenic compound are added as a second step. The carrying out of this process in two steps is particularly desirable in the production of acrylic esters from ethylene.

EXAMPLE 68

A reaction mixture containing 1.81 g. of 2-naphthylmercuric chloride, 5 ml. of acrylonitrile and 50 ml. of 0.1 M $Li_2PdCl_4$ in methanol was stirred at room temperature overnight. The solvent was then evaporated under reduced pressure and the product was recrystallized from aqueous methanol. There was obtained 0.53 g., 30%, of off-white crystals, M.P. 144–145°, of 3-(2-naphthyl)acrylonitrile. The compound had infrared absorption bands at 1612 and 2015 cm.$^{-1}$ and analyzed 86.90% C and 5.34% H.

EXAMPLE 69

A reaction mixture containing 4.27 g. of 2,3-dichloro-5-chloromercurinitrobenzene, 5 ml. of methyl acrylate and 100 ml. of 0.1 M $Li_2PdCl_4$ in methanol was stirred at room temperature overnight. The solvent was evaporated under reduced pressure and the product was recrystallized from hexane. There was obtained 0.53 g. of off-white needles, M.P. 145–146°, of methyl 3-nitro-4,5-dichlorocinnamate. The compound had infrared absorption bands at 1620 and 1715 cm.$^{-1}$ and analyzed 43.48% C, 2.29% H and 5.35% N.

EXAMPLE 70

A mixture of 3.0 g. of 3,5-bis(chloromercuri)nitrobenzene, 5 ml. of methyl acrylate and 110 ml. of $Li_2PdCl_4$ in methanol was stirred at room temperature overnight. The solvent was removed under reduced pressure and the product was extracted from the residue with hot chloroform. After evaporation of the chloroform and crystallization from benzene-hexane, there was obtained 0.27 g. of colorless powder, M.P. 213.5–214.5°, of dimethyl 5-nitro-1,3-benzene-bis(3-acrylate). The product had infrared absorption bands at 1650 and 1715 cm.$^{-1}$ and analyzed 57.69% C, 4.54% H and 4.86% N.

EXAMPLE 71

A mixture of 3.41 g. of 3-chloromercuribenzaldehyde, 5 ml. of styrene and 110 ml. of 0.1 M $Li_2PdCl_4$ in methanol was stirred at room temperature overnight. The reaction mixture was then concentrated under reduced pressure at room temperature. The product was extracted from the residue with boiling hexane, filtered, concentrated and cooled. There was obtained 0.78 g. of colorless product, M.P. 94.5–95.5°, which was 3-formylstilbene. The ultraviolet spectrum of the compound had bands at 295 m$\mu$ with $\epsilon=26,200$, 258 m$\mu$ with $\epsilon=16,800$ and at 234 m$\mu$ with $\epsilon=14,600$, and the compound analyzed 85.75% C and 6.32% H.

EXAMPLE 72

A mixture of 3.83 g. of pentamethylphenylmercuric chloride (prepared from pentamethylbenzene and mercuric acetate followed by reaction with chloride ion) 5 ml. of styrene and 110 ml. of 0.1 M $LiPdCl_3$ in acetonitrile was stirred at room temperature overnight. The solvent was evaporated under reduced pressure, and the product was purified by chromatography on alumina. There was obtained as product 0.8 g. of colorless prisms of M.P. 154–155° of 2,3,4,5,6 - pentamethylstilbene. The compound had an ultraviolet spectrum with bands at 273 m$\mu$ with $\epsilon=16,200$ and at 247 m$\mu$ with $\epsilon=14,800$ and it analyzed 91.19% C and 8.80% H.

EXAMPLE 73

A mixture of 10 mmoles of 4-vinylbiphenyl, 10 mmoles of 4-chloromercurianisole and 110 ml. of 0.1 M $Li_2PdCl_4$ in methanol was stirred overnight at room temperature. The solvent was removed under reduced pressure and the product was extracted from the residue with boiling benzene. On cooling, the benzent extracts deposited 0.25 g. of crystals of the product as colorless fluorescent plates. M.P. 236.0–236.5°. The product was 4-methoxy-4'-phenylstilbene. The compound had an ultraviolet absorption band at 321 m$\mu$ with $\epsilon=42,700$ and analyzed 88.30% C and 6.34% H.

EXAMPLE 74

A reaction was carried out as in Example 73 employing 2.7 g. of 4-vinylbiphenyl and 3.88 g. of 4-chloromercuric-2-nitroanisole. Isolation of the product in the same manner gave 0.56 g. of yellow crystals, M.P. 213.5–214.5°, of 4-methoxy-3-nitro-4'-phenylstilbene. This compound had an absorption in the ultraviolet region at 321 m$\mu$ with $\epsilon=55,000$ and it analyzed 76.22% C, 5.31% H and 4.29% N.

EXAMPLE 75

A reaction mixture containing 31.8 g. of phenylmercuric acetate, 20 ml. of allyl ethyl ether, 15.9 g. of mercuric acetate, 100 ml. of acetone and 2.24 g. of palladium acetate was stirred at room temperature for about 4 hours. Gas chromatographic analyses then indicated that the solution was 0.35 M in cinnamyl ethyl ether. The reaction mixture was then diluted with water and pentane. The pentane layer yielded 4.51 g. of colorless liquid, B.P. 84–95° (2 mm.) which was about 90% cinnamyl ethyl ether by gas chromatographic analyses. Redistillation gave a purer product, B.P. 89–93° (2 mm.). The N.M.R. spectrum and the U.V. spectrum confirmed that the compound was cinnamyl ethyl ether. The compound analyzed 82.15% C and 9.48% H.

EXAMPLE 76

A mixture of 31.8 g. of phenylmercuric acetate, 100 ml. of 1.0 M allyl acetate and 0.10 mole of palladium (II) acetate was stirred at room temperature overnight and then at 40–50° for an hour. The solution was then diluted with water and pentane and the product was isolated as in Example 75. There was obtained 11.0 g. of cinnamyl acetate, B.P. 104–110° (3 mm.) which was about 95% pure by gas chromatographic analysis. The N.M.R. spectrum confirmed the structure of the product.

EXAMPLE 77

A reaction mixture containing 0.10 mole of phenylmercuric chloride, 0.10 mole of $CuCl_2$, 20 ml. of dicyclohexylethylamine, 10 ml. of crotyl acetate and 100 ml. of 0.1 M $LiPdCl_3$ in acetonitrile was stirred and cooled initially to keep the temperature of the reaction mixture at about 25°. After 3 or 4 hours of stirring at room temperature, the product was isolated as in Example 76 except that it was washed with dilute sulfuric acid also in order to remove the dicyclohexylethylamine. Distillation of the product under reduced pressure gave two fractions (1) B.P. 59–100° (3 mm.), 0.8 g. which was about 25% 3-phenylbutenyl acetate by gas chromatographic analyses and (2) B.P. 104–140° (3 mm.), 3.6 g. which was about 75% of the same material. A purer sample was isolated by preparative scale gas chromatography, $n_D^{25}$ 1.5251. This material had infrared absorption bands at 1240, 1630 and 1745 cm.$^{-1}$ and it analyzed 76.39% C and 7.30% H.

EXAMPLE 78

A mixture of 0.10 mole of phenylmercuric acetate, 50 mmoles of mercuric acetate, 100 ml. of acetone, 20 ml. of allylbenzene and 10 mmoles of palladium acetate was stirred at room temperature overnight. The reaction mixture was then diluted with water and the product was extracted with pentane. Distillation of the product under reduced pressure gave 1.8 g. of colorless liquid product, B.P. 145–147° (3 mm.) which was about 90% pure trans-1,3-diphenylpropene. The compound was further purified by preparative scale gas chromatography. The product solidified on cooling and had a strong band at 966 cm.$^{-1}$ indicating the trans form was present. The N.M.R. spectrum of the product confirmed the structure. The sample analyzed 92.77% C and 7.64% H.

EXAMPLE 79

A reaction mixture containing 3.42 g. of p-chloro-mercuricumene, 4 ml. of styrene, and 110 ml. of 0.1 M $Li_2PdCl_4$ in methanol was stirred at room temperature for three days. The reaction mixture was then filtered and concentrated under reduced pressure at room temperature. The product was extracted from the residue with boiling hexane. After the extracts were concentrated and cooled, colorless crystals of the product were obtained. Two further crystallizations from methanol gave 1.14 g. (42.4%) of 4-isopropylstilbene, M.P. 90–91°. The product analyzed 91.7% C and 8.35% H.

EXAMPLE 80

A mixture of 3.19 g. of 3,5-bis(acetoxymercuri)salicylaldehyde, 2 ml. of vinyl methyl ketone, and 100 ml. of 0.1 M $LiPdCl_3$ in acetonitrile solution was stirred at room temperature overnight. Three such reaction mixtures were combined, diluted with water and methylene chloride, filtered, and extracted several times with methylene chloride. The combined extracts were evaporated under reduced pressure. The product remaining after the solvent had been removed was recrystallized twice from hexane. There was obtained 0.050 g. of pale yellow crystals, M.P. 86–87°, of salicylaldehyde - 3,5-bis[1-(1-buten-3-one)]. The product had infrared absorption bands at 1640, 1660 and 1700 cm.$^{-1}$ and it analyzed 69.34% C and 5.66% H.

EXAMPLE 81

To a mixture of 3.13 grams (10 mmoles) phenylmercuric chloride
1.35 grams (10 mmoles) cupric chloride
0.42 gram (10 mmoles) lithium chloride
8 grams acetic acid
1 gram water
0.9 gram vinyl acetate was added 1.0 ml. 0.1 molar $Li_2PdCl_4$ in acetic acid at 24° C. and the mixture was stirred at 24° C. for 24 hours. A sample of this product was analyzed by gas chromatography. The yield of phenylacetaldehyde was 30% of theoretical.

EXAMPLE 82

To a mixture of 3.13 grams (10 mmoles) phenylmercuric chloride
1.35 grams (10 mmoles) cupric chloride
0.42 gram (10 mmoles) lithium chloride
7 grams acetic acid
1 gram water
0.9 gram isopropenyl acetate was added 1.0 ml. 0.1 molar $Li_2PdCl_4$ in acetic acid, at 24° C. and the mixture was stirred at 24° C. for 24 hours. A sample of the product was analyzed by gas chromatography. The yield of phenyl acetone was 50% of theoretical.

EXAMPLE 83

To a mixture of 3.63 grams (10 mmoles) naphthylmercuric chloride
1.35 grams (10 mmoles) cupric chloride
0.42 gram (10 mmoles) lithium chloride
7 grams acetic acid
1 gram water
0.9 gram vinyl acetate was added 1.0 ml. 0.1 molar $Li_2PdCl_4$ in acetic acid, at 24° C. and the mixture was stirred at 24° C. for 24 hours. A sample of the product was analyzed by gas chromatography. The yield of naphthyl acetaldehyde was 10% of theoretical.

EXAMPLE 84

To a mixture of 3.13 grams (10 mmoles) phenyl mercuric chloride
1.35 grams (10 mmoles) cupric chloride
0.42 gram (10 mmoles) lithium chloride
7 grams acetic acid
1 gram water
0.9 gram propenyl acetate was added 1.0 ml. 0.1 molar $Li_2PdCl_4$ in acetic acid at 24° C. and the mixture was stirred at 24° C. for 24 hours. A sample of the product was analyzed by gas chromatography. The yield of hydratropaldehyde was 40% of theoretical.

EXAMPLE 85

To a mixture of 3.63 grams (10 mmoles) 2-naphthyl mercuric chloride
1.34 grams (10 mmoles) cupric chloride
0.42 gram (10 mmoles) lithium chloride
7 grams acetic acid
1 gram water
0.9 gram isopropenyl acetate was added 1.0 ml. 0.1 molar $Li_2PdCl_4$ in acetic acid at 24° C. and the mixture was stirred at 24° C. for 24 hours. A sample of the product was analyzed by gas chromatography. The yield of 2-naphthylacetone was 20% of theoretical.

EXAMPLE 86

To a mixture of 6.26 grams (20 mmoles) phenyl mercuric acetate
2.70 grams (20 mmoles) cupric chloride
0.84 gram (20 mmoles) lithium chloride
7 grams acetic acid
1 gram water
1.8 grams isopropenyl acetate was added 1.0 ml. 0.1 molar $Li_2PdCl_4$ in acetic acid at 24° C. and the mixture was stirred at 24° C. for 24 hours. A sample of the product was analyzed by gas chromatography. The yield of phenylacetone was 15% of theoretical.

EXAMPLE 87

To a mixture of 3.37 grams (10 mmoles) phenyl mercuric acetate
2.68 grams (20 mmoles) cupric chloride
0.82 gram (20 mmoles) lithium chloride
7 grams acetic acid
1 gram water
0.9 gram isopropenyl acetate was added 1.0 ml. 0.1 molar $Li_2PdCl_4$ in acetic acid at 24° C. and the mixture was stirred at 24° C. for 24 hours. A sample of the product was analyzed by gas chromatography. The yield of phenylacetone was 25% of theoretical.

EXAMPLE 88

To a mixture of 3.13 grams (10 mmoles) phenyl mercuric chloride
1.34 grams (10 mmoles) cupric chloride
0.42 gram (10 mmoles) lithium chloride
8 grams acetic acid
trace water
0.9 gram 2,2-dimethylvinyl acetate was added 1.0 ml. of 0.1 molar $Li_2PdCl_4$ in acetic acid at 24° C. and the mixture was stirred at 24° C. for 24 hours. A sample of the product was analyzed by gas chromatography. The yield of 2,2-dimethyl-2-phenylacetaldehyde was 15% of theoretical.

EXAMPLE 89

A mixture of 0.31 gram phenylmercuric chloride, 10 ml. 0.1 molar $Li_2PdCl_4$ in acetic acid, 1 gram water, and 0.9 gram isopropenyl acetate were mixed and stirred at 24° C. for 72 hours, and 60° C. for 2 hours. At the end of this period, a sample was analyzed by gas chromatography. The yield was 60% of theory of phenyl acetone.

EXAMPLE 90

A mixture of 0.31 gram phenylmercuric chloride, 10 ml. 0.1 molar $Li_2PdCl_4$ in methanol, 1 gram water, and 0.9 gram isopropenyl acetate were mixed and stirred at 24° C. for 72 hours and 60° C. for 2 hours. At the end of this period, a sample was analyzed by gas chromatography. The yield was 100% of theory of phenyl acetone.

EXAMPLE 91

A mixture of 0.31 gram phenylmercuric chloride, 10 ml. 0.1 molar $LiPdCl_3$ in acetonitrile, 1 gram water, and 1 gram isopropenyl acetate were mixed and stirred at 24° C. for 72 hours. At the end of this period, a sample was analyzed by gas chromatography. The yield was 20% of theory of phenyl acetone.

EXAMPLE 92

A mixture of 1.1 grams tetraphenyltin (2.5 mmole)
2.68 grams (20 mmoles) cupric chloride
0.82 gram (20 mmoles) lithium chloride
7 grams acetic acid
1 gram water
0.9 gram isopropenyl acetate was stirred with 1 ml. 0.1 molar $Li_2PdCl_4$ in acetic acid for 72 hours at 24° C. A sample of the mixture was analyzed by gas chromatography. The yield of phenyl acetone was 6% of theory.

EXAMPLE 93

A mixture of 1.3 grams tetraphenyllead (2.5 mmole)
2.68 grams (20 mmoles) cupric chloride
0.82 gram (20 mmoles) lithium chloride
7 grams acetic acid
1 gram water
0.9 gram isopropenyl acetate was stirred with 1 ml. 0.1 molar $Li_2PdCl_4$ in acetic acid for 72 hours at 24° C. A sample of the mixture was analyzed by gas chromatography. The yield of phenyl acetone was 10% of theory.

EXAMPLE 94

A mixture of 3.13 grams (10 mmoles) phenylmercuric chloride, 5 grams water and 1.0 gram 1-acetoxystyrene were stirred with 100 ml. 0.1 molar $Li_2PdCl_4$ in methanol for 72 hours at 24° C. A sample of the product was analyzed by gas chromatography. The yield of benzyl phenyl ketone was 25% of theory.

EXAMPLE 95

A mixture of 10 mmoles p-chloromercuricbenzoic acid, 2 ml. isopropenyl acetate, 5 ml. water and 100 ml. 0.1 M $Li_2PdCl_4$ in acetic acid was stirred at room temperature for three days. The reaction mixture was diluted with water and methylene chloride and filtered to remove the palladium metal formed. The methylene chloride layer was separated and the aqueous solution was extracted three more times with methylene chloride. The extracts were combined, washed with water, dried with anhydrous magnesium sulfate and evaporated. The residue remaining after evaporating the solvent was dissolved in boiling aqueous methanol, filtered from a little palladium metal still present, and cooled. The product separated as colorless crystals. The product was filtered and recrystallized from benzene-hexane. There was obtained 0.065 g. (3.7%) of colorless p-carboxybenzyl methyl ketone, M.P. 196.5–197.0° C.

*Analysis.*—Found (percent): C, 67.25; H, 5.94.

EXAMPLE 96

A reaction mixture containing 10 mmoles $PdCl_2$, 20 mmoles of lithium chloride, 10 mmoles of phenylmercuric chloride, 1.0 ml. isopropenyl acetate, 7 ml. methanol and 1 ml. of water was stirred at room temperature for two days. Gas chromatographic analysis then showed the reaction mixture to be 0.421 M in benzyl methyl ketone (38%). There was also a little diphenyl present.

EXAMPLE 97

A reaction mixture containing 50 mmoles of phenylmercuric chloride, 50 mmoles lithium chloride, 50 mmoles cupric chloride, 37 ml. acetic acid, 2.5 ml. water, 5 ml. vinyl acetate and 5 ml. $Li_2PdCl_4$ in acetic acid was stirred at room temperature for 2 hours. Three such reaction mixtures were combined and diluted with water and methylene chloride. After filtering, the methylene chloride layer was separated and the aqueous layer was extracted three more times with methylene chloride. The combined methylene chloride solutions were washed with water, dried over anhydrous magnesium sulfate and distilled under reduced pressure. There was obtained 5.2 g. of colorless liquid phenylacetaldehyde, B.P. 71–80° C. (7 mm.), which was 87% pure by gas chromatography (about a 25% yield). A portion of the product was converted into a 2,4-dinitrophenylhydrazone, M.P. 116–116.5° C. after several recrystallizations from ethanol.

*Analysis.*—Found (percent): C, 56.25; H, 4.20; N, 18.72.

EXAMPLE 98

A reaction mixture containing 10 mmoles phenylmercuric chloride, 1 ml. acetophenone enol acetate, 5 ml. of water and 100 ml. of 0.1 M $Li_2PdCl_4$ in methanol was stirred at room temperature for three days. The reaction mixture was then filtered to remove palladium metal and evaporated in vacuum. The residue was extracted with hot hexane. On cooling, the hexane solution deposited crystals of benzyl methyl ketone. The product was further purified by vacuum distillation and the two recrystallizations from aqueous methanol. There was obtained 0.125 g. of product (6.4%), M.P. 55.5–56.0° C.

*Analysis.*—Found (percent): C, 85.82; H, 6.49.

EXAMPLE 99

A reaction mixture containing 8.8 mmoles of m-chloromercurinitrobenzene, 1.1 ml. acetophenone enol acetate, 5 ml. water and 100 ml. 0.1 M $Li_2PdCl_4$ in methanol was stirred at room temperature overnight. The solution was then filtered and concentrated by evaporating the solvent. The product was extracted from the residue with hot hexane. After cooling, the hexane solution deposited sticky crystals of 3-nitrobenzyl phenyl ketone. Two further crystallizations from aqueous methanol gave 0.200 g. of nearly colorless needles, M.P. 79.5–80.5° C. (9.4%).

*Analysis.*—Found (percent): C, 69.64; H, 5.02; N, 5.60.

The ultraviolet spectrum of the product in ethanol solution had an absorption maximum at 247 m$\mu$ with $\epsilon=18,800$.

EXAMPLE 100

A reaction mixture containing 10 mmoles 4-phenylphenylmercuric chloride, 1 ml. propenyl acetate, 5 ml. water and 100 ml. 0.1 M $Li_2PdCl_4$ in methanol was stirred at room temperature for three days. The reaction mixture was then filtered and the solvent evaporated under reduced pressure. The product was extracted from the residue with boiling hexane. On cooling, the hexane solution gave a solid 2-(4-phenyl)phenylpropionaldehyde which was separated and reacted with a solution of 2,4-dinitrophenylhydrazine in sulfuric acid-ethanol solution. The yellow derivative which formed was filtered and recrystallized twice from chloroform-methanol. There was obtained 0.042 g. of yellow-orange product (~1%) of M.P. 191–192° C.

*Analysis.*—Found (percent): C, 64.39; H, 4.81; N, 13.80.

EXAMPLE 101

A reaction mixture containing 1.5 g. (4 mmoles) 4-chloromercuri-1,2-dichlorobenzene, 0.54 g. of p-methoxyacetophenone enol acetate (M.P. 68–70° C.), 50 ml. 0.1 M $Li_2PdCl_4$ in methanol and 2 ml. water was stirred at room temperature overnight. The reaction mixture was then filtered and concentrated under reduced pressure. The product was extracted from the residue with boiling hexane. After concentrating and cooling, crystals of 3,4-dichlorobenzyl p-anisyl ketone were obtained. These were recrystallized using charcoal to decolorize the hexane solution, to give 0.13 g. of crude product (11%), M.P. 101–103° C. Further recrystallization from hexane and twice from aqueous methanol gave colorless needles, M.P. 113.0–113.2° C.

*Analysis.*—Found (percent): C, 60.9; H, 4.59.

EXAMPLE 102

A reaction mixture containing 50 mmoles of phenylmercuric chloride, 50 mmoles cupric chloride, 50 mmoles lithium chloride, 5 ml. propenyl acetate, 35 ml. acetic acid, 5 ml. water and 5 ml. 0.1 M $Li_2PdCl_4$ in acetic acid was stirred at room temperature overnight. Four such reaction mixtures were combined and the product was isolated. There was obtained 5.1 g. of colorless product, B.P. 60–70° C. (4 mm.). A second fraction of 8 g., B.P. 120–160° C. (4 mm.) was also obtained. Gas chromatographic analysis showed the first fraction was 95% pure 2-phenylpropionaldehyde (18% yield) and the second contained about 50% of the first product. Redistillation of the second fraction gave 0.3 g. of the first product and material of B.P. 70–150° C. (6 mm.). This fraction solidified. After four crystallizations from aqueous methanol, there was obtained 0.6260 g. of shiny, colorless plates, M.P. 88.5–89.0° C., which proved to be 1,2-diphenyl-1-propene.

*Analysis.*—Found (percent): C, 92.42; H, 7.42.

The N.M.R. spectrum in deuterochloroform at 60 mc. had bands at −134 cps. (2 singlets of relative area 3 from the methyl group), at −404 cps. (narrow doublet of relative area 1 from the vinyl hydrogen) and at −435 cps. (multiplet of relative area 10 from the aromatic protons) with respect to tetramethylsilane as an internal standard.

Redistillation of the lower boiling fraction gave a purer sample of 2-phenylpropionaldehyde. The N.M.R. spectrum in deuterochloroform at 60 mc. had bands at −81 cps. (doublet with $J=7$, relative area 3 from the methyl group), −209 cps. (8 lines with relative area 1 from the tertiary hydrogen), at −430 cps. (a multiplet of relative area 5 from the aromatic protons) and at −572 cps. (doublet, $J=1½$, with relative area 1 from the aldehyde proton) with respect to tetramethylsilane as an internal standard.

*Analysis.*—Found (percent): C, 79.5; H, 7.8.

EXAMPLE 103

A reaction was carried out exactly as in the 2-phenylpropionaldehyde preparation in Example 102 but using isobutyraldehyde enol acetate instead of propenyl acetate. Four similar reaction mixtures were combined and isolated as in the 2-phenylpropionaldehyde preparation. There was obtained 3 g. of product, B.P. 77–100° C. (4 mm.), which was 50% 2-phenyl-2-methylpropionaldehyde by gas chromatography (7% yield). Biphenyl was a major by-product of the reaction. A pure sample of the aldehyde was obtained by preparative gas chromatography. The N.M.R. spectrum of pure material at 60 mc. in deuterochloroform solution had bands at −81 cps. (singlet of relative area 6 from the methyl groups), at −428 cps. (narrow multiplet of relative area 5 from the aromatic protrons), and at −558 cps. (singlet of relative area 1 from the aldehyde proton) with respect to tetramethylsilane as an internal standard.

*Analysis.*—Found (percent): C, 79.7; H, 8.8.

EXAMPLE 104

A mixture of 10 mmoles of 3-nitrophenylmercuric chloride, 10 mmoles of lithium chloride, 10 mmoles of cupric chloride, 1 ml. of vinyl acetate, 9 ml. of acetone and 1 ml. of 0.1 M $Li_2PdCl_4$ in acetone was stirred at room temperature overnight. The reaction mixture was then diluted with methylene chloride and poured into an aluminum column. The yellow product was eluted with more methylene chloride. Evaporation of the eluate and two recrystallizations from acetic acid gave 0.112 g. of yellow crystals, M.P. 245.0–245.5°. In isooctane solution, the compound had $\lambda_{max}$. 283–8 m$\mu$ with $\epsilon=35,800$. The compound corresponding to 3,3′-dinitrostilbene analyzed 62.26% C, 3.91% H and 10.46% N.

EXAMPLE 105

A mixture of 10 mmoles of methyl 3-chloromercuribenzoate, 10 mmoles of cupric chloride, 2 ml. of vinyl acetate, and 10 ml. of 0.1 M $LiPdCl_3$ in acetonitrile was stirred at room temperature overnight. The product was isolated as in Example 104. Two recrystallizations of the crude product from methanol gave 0.137 g. of colorless crystals of 3,3′-bis-(carbomethoxy)stilbene, M.P. 152–152.5°. In isooctane solution the compound had bands at 317 m$\mu$ (shoulder) ($\epsilon=16,000$), 290 m$\mu$ ($\epsilon=27,800$), 238 m$\mu$ ($\epsilon=26,800$) and at 230 m$\mu$ ($\epsilon=25,200$). The compound had an infrared absorption band at 1725 cm.$^{-1}$ in chloroform solution and analyzed 72.41% C and 5.69% H.

EXAMPLE 106

A mixture of 0.10 mole of p-anisylmercuric chloride, 0.10 mole of cupric chloride, 80 ml. of acetic acid, 0.10 mole of lithium chloride, 20 ml. of propenyl acetate, and 10 ml. of 0.1 M $Li_2PdCl_4$ in acetic acid was stirred at room temperature for three hours. The reaction mixture was then poured into water and the products were extracted from the mixture with pentane. Distillation gave a fraction with B.P. 100–120° (2 mm.), weighing 3.75 g. This material was about 80% 2-p-anisylpropionaldehyde by gas chromatographic analysis. A sample was obtained for analysis by preparative scale gas chromatography. The sample analyzed 72.85% C and 7.71% H. The pot residue from the distillation was recrystallized from hexane and from aqueous ethanol to give 0.435 g. of colorless plates, M.P. 123.5–124.5° which proved to be 1,2-di-p-anisyl-1-propene. In isooctane solution, the compound showed $\lambda_{max}$. 287 m$\mu$ with $\epsilon$=28,000. It analyzed 80.69% C and 7.28% H.

EXAMPLE 107

A reaction mixture containing 0.10 mole of 3-nitrophenylmercuric chloride, 0.10 mole of cupric chloride, 90 ml. of acetic acid, 10 ml. of propenyl acetate, and 10 ml. of 0.1 M $Li_2PdCl_4$ in acetic acid was stirred at room temperature overnight. The reaction mixture was diluted with water and the products were extracted with ether. The extracts were dried over anhydrous magnesium sulfate, concentrated on the steam bath to a yellow oil, and chromatographed on alumina. There was obtained 0.13 g. of pale yellow crystals of M.P. 201.5–202.0° of 1,2-di(3-nitrophenyl)-1-propene. The compounds analyzed 60.91% C, 4.15% H and 9.30% N.

EXAMPLE 108

A reaction mixture containing 10 mmoles of 4-chloromercuribenzoic acid, 2 ml. of isopropenyl acetate, 5 ml. of water, and 100 ml. of 0.1 M $Li_2PdCl_4$ in acetic acid was stirred at room temperature for three days. The reaction mixture was then filtered to remove precipitated palladium metal and evaporated under reduced pressure. The residue remaining was extracted with hot hexane. On cooling, the hexane solution deposited 0.062 g. of crystals of 4-carboxybenzyl methyl ketone, M.P. 143–144°. It analyzed 67.25% C and 5.94% H.

EXAMPLE 109

A reaction mixture containing 0.10 mole of phenylmercuric chloride, 0.10 mole of cupric chloride, 20 ml. of acetophenone enol benzoate and 100 ml. of 0.1 M $Li_2PdCl_4$ in acetone was stirred at room temperature for three hours. Gas chromatographic analysis then showed that the solution was 0.33 M in benzyl phenyl ketone. Isolation of the product by adding water and extracting with pentane gave 10.8 g. of product, B.P. 105–165° (4 mm.) which was a mixture of benzyl phenyl ketone and unreacted acetophenone enol benzoate. Two recrystallizations from pentane gave 5.4 g. of colorless crystals, M.P. 50.5–52.5° C. It analyzed 85.82% C and 6.49% H, and it had infrared absorption bands at 1640 and 1720 cm.$^{-1}$ in chloroform solution.

EXAMPLE 110

A mixture of 8.8 mmoles of 3-nitrophenylmercuric chloride, 1.1 ml. of acetophenone enol acetate, 5 ml. of water and 100 ml. of 0.1 M $Li_2PdCl_4$ in methanol was stirred at room temperature overnight. The reaction mixture was then filtered and the solvent was removed under reduced pressure. The product was extracted from the residue with hot hexane. On cooling, sticky crystals separated from the hexane solution. Two recrystallizations from aqueous methanol gave 0.20 g. of colorless needles, M.P. 79.5–80.5° of 3-nitrobenzyl phenyl ketone. The compound analyzed 69.64% C, 5.02% H and 5.60% N. Its ultraviolet spectrum contained a strong band at 247 m$\mu$ with $\epsilon$=18,000 in isooctane solution.

EXAMPLE 111

A reaction mixture containing 1.5 g. (4 mmoles) of 4-chloromercuric-1,2-dichlorobenzene, 0.54 g. of p-methoxyacetophenone enol acetate (M.P. 68–70°), 2 ml. of water and .5 ml. of 0.1 M $Li_2PdCl_4$ in methanol was stirred at room temperature overnight. Isolation of the product as in Example 110 and three recrystallizations from aqueous methanol gave 0.092 g. of colorless needles of p-anisyl-3,4-dichlorobenzyl ketone, M.P. 113.0–113.5°. It analyzed 60.88% C and 4.59% H.

EXAMPLE 112

A mixture of 1.6 grams cupric chloride and 3.1 grams phenylmercuric chloride in 8 ml. methanol was stirred with 0.85 gram allyl alcohol and 1.0 ml. 0.1 molar $Li_2PdCl_4$ in methanol at 24° C. for 16 hours. Gas chromatographic analysis on the reaction mixture indicated a yield of 25% of theory of $\beta$-phenyl propionaldehyde which is the stable tautomer of 1-hydroxy-3-phenyl-1-propene resulting from isomerization of the latter. The aldehyde was further identified by the formation and isolation of 0.34 gram of the 2,4-dinitrophenyl hydrazone of $\beta$-phenyl propionaldehyde, M.P. 151–151.5° C., which analyzed 57.69% C, 4.47% H, and 17.43% N.

EXAMPLE 113

A mixture of 3.7 grams p-acetoxymercurianisole, 1.6 grams cupric chloride, 0.85 gram allyl alcohol, 8 ml. methanol and 1.0 ml. 0.1 molar $Li_2PdCl_4$ in methanol was stirred for 72 hours at 24° C. The 1-hydroxy-3-p-anisyl-1-propene formed by the reaction isomerized to p-anisylpropionaldehyde which was readily characterized by preparation of the corresponding 2,4-dinitrophenylhydrazone, M.P. 140.4–141.2° C. which analyzed 55.22% C and 4.82% H.

EXAMPLE 114

A mixture of 0.35 gram diphenylmercury, 0.93 gram allyl acetate and 10 ml. 0.1 molar $LiPdCl_3$ in acetonitrile solution was stirred at 24° C. for 16 hours. Gas chromatography of the resulting reaction mixture showed it to be 0.03 molar in allyl-benzene and 0.017 molar in trans-propenylbenzene with a trace of cis-propenylbenzene along with some cinnamyl acetate. The propenylbenzenes are explained as resulting from isomerization of the initially formed allylbenzene.

EXAMPLE 115

A mixture of 0.31 gram phenylmercuric chloride, 0.8 gram diallyl ether and 10 ml. 0.1 molar $Li_2PdCl_4$ in methanol was stirred 16 hours at 24° C. Analysis by gas chromatography showed that the resulting reaction mixture was 0.017 molar in allyl benzene. This is a yield of 18.7% of theory.

EXAMPLE 116

A mixture of 0.31 gram phenylmercuric chloride, 0.8 gram allyl ethyl ether, and 10 ml. 0.1 molar $Li_2PdCl_4$ in methanol was stirred 16 hours at 24° C. The resulting reaction mixture was shown by gas chromatography to be 0.018 molar in allyl benzene. This corresponds to a 20% of theoretical yield.

EXAMPLE 117

A mixture of 0.35 gram p-chloromercurianisole, 0.94 gram allyl chloride and 10 ml. 0.1 molar $Li_2PdCl_2$ in methanol was stirred 16 hours at 24° C. The resulting reaction mixture was shown by gas chromatography to contain estragole in an amount corresponding to a yield of 40% of theoretical.

EXAMPLE 118

When 0.31 gram phenylmercuric chloride was substituted for 0.35 gram p-chloromercurianisole in Example 117, allyl benzene was obtained in a yield of 56% of theory.

EXAMPLE 119

When methallyl chloride was substituted for allyl chloride in place of allyl chloride in Example 118, methallyl benzene was obtained in a yield of 40% of theory.

EXAMPLE 120

A mixture of 4 grams mercuric acetate and 9.9 grams anisole was stirred at 100° C. for 1 hour and cooled to 24° C. Then 0.01 gram palladium acetate and 1 gram allyl chloride were added, and the mixture was stirred at 24° C. for 16 hours. By gas chromatography, the resulting reaction mixture was shown to be 0.283 molar in estragole. This corresponds to 52% of theoretical yield.

EXAMPLE 121

A mixture of 2.7 grams mercuric trifluoroacetate, 0.002 gram palladium acetate, 5 grams anisole, and 0.49 gram allyl chloride was stirred for 16 hours at 24° C. The resulting reaction mixture was shown by gas chromatography to be 0.242 molar in estragole. This corresponds to a yield of 53% of theory.

EXAMPLE 122

A mixture of 2 millimoles phenylmercuric chloride, 1.4 grams of tetramethylethylene, and 20 ml. 0.1 molar $LiPdCl_3$ in acetonitrile was stirred for 16 hours at 24° C. Analysis by gas chromatography showed that the resulting reaction mixture contained about a 50% yield of phenylhexenes, of which about one-half was 2,3-dimethyl-3-phenylbutene-1.

EXAMPLE 123

A mixture of 50 millimoles phenylmercuric chloride, 0.85 gram allyl alcohol, 5 ml. 0.1 molar $Li_2PdCl_4$ in acetic acid, 50 millimoles each of LiCl and $CuCl_2$ in 35 ml. acetic acid and 5 grams water was stirred in contact with air at 24° C. for 2 hours. The yield of 3-phenylpropionaldehyde was 18% of theory.

EXAMPLE 124

A mixture of 10 millimoles of 4-chloromercuribenzoic acid, 100 ml. 0.1 molar $Li_2PdCl_4$, and 0.94 gram allyl chloride was stirred for 24 hours at 24° C. The yield of 4-propenylbenzoic acid was 16% of theory.

EXAMPLE 125

A reaction mixture containing 10 mmoles of phenylmercuric acetate, 10 mmoles of LiBr, 10 mmoles $CuBr_2$, 1 ml. of allyl bromide, 10 ml. of acetonitrile, and 1 mmole of palladium acetate was stirred at room temperature overnight. The solution was then 0.18 M in allylbenzene, 0.10 M in transpropenylbenzene, and 0.30 M in bromobenzene.

EXAMPLE 126

A mixture of 1 mmole of phenylmercuric chloride, 1 ml. of crotyl chloride (95% crotyl chloride and 5% 3-chloro-1-butene), and 10 ml. of 0.1 M $LiPdCl_3$ in acetonitrile was stirred at room temperature overnight and analyzed by gas chromatography. The solution was 0.01 M in trans-1-phenyl-2-butene. A major product was unidentified, but it probably was 3-phenyl-1-butene. A similar experiment employing 3-chloro-1-butene instead of crotyl chloride yielded a reaction mixture which was 0.05 M in trans-1-phenyl-2-butene with other, but unknown, products also present. The remaining allylic chlorides in both of these experiments were found to be mixtures containing 74% of crotyl chloride and 26% of 1-chloro-3-butene.

EXAMPLE 127

A reaction mixture containing 50 mmoles (15.65 g.) of phenylmercuric chloride, 10 mmoles (1.34 g.) of $CuCl_2$, 10 ml. 95% crotyl chloride, 25 ml. of acetonitrile and 5 ml. of 0.1 M $LiPdCl_3$ in acetonitrile was stirred at room temperature overnight. The products were isolated by adding 25 ml. of water and 100 ml. of pentane. The pentane layer yielded 1.9 g. of colorless liquid product, B.P. 95–125° (47 mm.). At least seven compounds were determined to be present in the product by gas chromatography. By comparing retention times, three of the products were identified as 2-phenyl-2-butene (~34%), 1-phenyl-1-butene (~29%), and 1-phenyl-2-butene (~15%).

EXAMPLE 128

A reaction mixture containing 1 mmole of phenylmercuric chloride, 1 ml. of methallyl chloride and 10 ml. of 0.1 M $LiPdCl_3$ in acetonitrile was stirred at room temperature overnight. Analysis by gas chromatography indicated that the reaction mixture was 0.067 M in methallylbenzene.

EXAMPLE 129

A reaction mixture containing 50 mmoles (15.65 g.) of phenylmercuric chloride, 20 ml. of 2,3-dichloro-1-propene, 80 ml. of acetonitrile, and 20 ml. of 0.1 M $LiPdCl_3$ in acetonitrile was stirred at room temperature overnight. The product was isolated by adding water and pentane, and distilling the pentane extract. Distillation under reduced pressure gave 5.21 g. of colorless product, B.P. 89–90° (15 mm.) which was about 95% 1-phenyl-2-chloro-2-propene by gas chromatography. An analytically pure sample was obtained by preparative scale gas chromatography. The product analyzed 70.68% C and 6.37% H.

EXAMPLE 130

A reaction was carried out as in the above experiment with 0.080 mole of 4-chloromercuri-N,N-diethylaniline, 16 mmoles of $CuCl_2$, 32 ml. of allyl chloride, 60 ml. of acetonitrile, and 20 ml. of 0.1 M $LiPdCl_3$ in acetonitrile. Cooling of the reaction mixture was necessary initially to keep the temperature from rising above 30°. After about 30 minutes' stirring at 25–30°, the reaction was complete. The reaction mixture was diluted with a solution of 12 g. of sodium hydroxide in 300 ml. of water and with 300 ml. of ether. The ether layer was distilled under reduced pressure. There was obtained 5.3 g. of 4-allyl-N,N-diethylaniline, 95% pure by gas chromatography, B.P. 98–100° (2 mm.). A pure sample was obtained by preparative scale gas chromatography. This material analyzed 82.46% C, 9.88% H and 7.89% N.

EXAMPLE 131

A mixture of 0.090 mole (34.4 g.) of methyl 4-chloromercuribenzoate, 30 mmoles of $CuCl_2$, 20 ml. of allyl chloride, 50 ml. of acetonitrile and 10 ml. of 0.1 M $LiPdCl_3$ in acetonitrile was stirred in an ice bath initially and then at room temperature for three hours. The product was isolated by adding 300 ml. hexane and 300 ml. of water. The hexane layer was distilled under reduced pressure. There was obtained 4.9 g. of colorless product, B.P. 87–93° C. (2.5 mm.), mainly 90–92° C. (2.5 mm.), which was about 95% methyl 4-allylbenzoate by gas chromatography. A lower boiling fraction of 1–2 g. was 75% this product also. A higher boiling fraction of about 2 g. solidified, M.P. 92–94° C. It was probably dimethyl 3,3'-diphenyldicarboxylate. A pure sample of methyl 4-allylbenzoate was obtained by preparative-scale gas chromatography from the 95% pure fraction above. It analyzed 75.0% C. and 6.51% H.

EXAMPLE 132

A reaction was carried out by reacting 0.10 mole (35.8 g.) of 3-chloromercurinitrobenzene, 20 mmoles of $CuCl_2$, 40 ml. of 1,2-dichloro-2-propene, 75 ml. of acetonitrile and 25 ml. of 0.1 M LiPdCl$_3$ in acetonitrile. After the solution was stirred at room temperature overnight, gas chromatographic analysis showed that the solution was 0.62 M in 1-(3-nitrophenyl)-2-chloro-1-propene. The reaction mixture was diluted with a solution of 12 g. of sodium hydroxide in 300 ml. of water and 300 ml. of ether was added. The product was isolated from the ether solution by distillation under reduced pressure. There was obtained 10.0 g. of pale yellow liquid, B.P. 107–112° C. (2 mm.) which was shown by gas chromatography to be about 95% pure 1 - (3-nitrophenyl)-2-chloro-1-propene. Redistillation, B.P. 108–110° C. (2 mm.), gave an analytically pure sample, $N_D^{25}$ 1.5574. This material analyzed 54.16% C, 4.36% H and 7.26% N. The pot residue from the original distillation crystallized on cooling. Recrystallization from benzene-hexane gave 1 g. of 3,3'-dinitrodiphenyl, M.P. 208.0–208.5°.

EXAMPLE 133

A mixture of 76.4 g. (0.2 mole) of 1,2-dichloro-4-chloromercuribenzene, 40 mmoles of CuCl$_2$, 40 ml. of allyl chloride, and 120 ml. of 0.1 M LiPdCl$_3$ in acetonitrile was stirred overnight, with initial cooling to keep the temperature at about 25°. The product was isolated by adding water and extracting with pentane. Distillation of the product through a short Vigreux column gave three fractions: (1) B.P. 51–73° C. (2 mm.), 2.9 g. which contained about 40% 3,4-dichloroalkylbenzene, (2) B.P. 73–79° C. (2 mm.), 7.8 g. which was about 95% 3,4-dichloroallylbenzene, $N_D^{25}$ 1.5538, and (3) B.P. 81–120° C. (2 mm.), 3.62 g. which contained about 70% 3,4-dichloroallylbenzene. Fraction (3) analyzed 57.93% C, 4.47% H and 38.1% Cl.

EXAMPLE 134

A reaction mixture containing 0.1 mole of crude 3-chloromercuribenzaldehyde, 40 mmoles of CuCl$_2$, 40 ml. of allyl chloride, and 100 ml. of 0.1 M LiPdCl$_3$ in acetonitrile was stirred at room temperature overnight. Cooling with ice water was necessary initially to keep the reaction mixture from becoming warm. The product was isolated as in Example 133. Two fractions were obtained by distillation, (1) B.P. 77–83° C. (3 mm.), 6.25 g. which was about 85% allylbenzaldehyde by gas chromatography and (2) B.P. 85–120° C. (3 mm.), 0.9 g. which contained about 90% of the same product. A sample for carbon and hydrogen analyses was obtained by preparative scale gas chromatography from the crude product. The purified product, $N_D^{25}$ 1.5444, appeared homogeneous by gas chromatography, but the N.M.R. spectrum showed it to be a mixture of isomers: about 85% meta and 15% of another isomer. The mixture analyzed 81.30% C and 7.30% H. A 2,4 - dinitrophenylhydrazone was prepared from the crude product and recrystallized from chloroform-ethanol, M.P. 198.0–198.5° C. It analyzed 58.90% C, 4.32% H and 17.17% N.

EXAMPLE 135

A reaction mixture containing 0.1 mole of 2-chloromercurithiophene, 0.1 mole of CuCl$_2$, 10 ml. of allyl chloride and 90 ml. of 0.1 M LiPdCl$_3$ in acetonitrile was stirred with ice cooling, but the temperature rose to 50° C. initially. When the reaction mixture had been cooled to 25° C., stirring was continued for two hours at room temperature, and then the product was isolated as in Example 133. A flash distillation of the product gave 1.6 g. of colorless liquid, B.P. 155–190° C. at atmospheric pressure. Gas chromatographic analyses showed that the distillate was about 95% 2-allylthiophene. A purer sample was isolated by preparative scale gas chromatography. It analyzed 68.25% C and 6.25% H.

EXAMPLE 136

A reaction mixture containing 5 mmoles (3.18 g.) of bis(acetoxymercuri)mesitylene, 10 mmoles of LiCl, 4 mmoles of CuCl$_2$, 4 ml. of allyl chloride and 10 ml. of 0.1 M LiPdCl$_3$ in acetonitrile was stirred at room temperature overnight. The reaction mixture was then concentrated at room temperature under reduced pressure. The product was isolated from the residue by extraction with pentane, and the residue was flash distilled at 3 mm. pressure. There was obtained 0.71 g. of colorless liquid which was about 70% diallylmesitylene. A sample isolated by preparative scale gas chromatography analyzed 89.22% C and 9.71% H.

EXAMPLE 137

A mixture of 0.10 mole of phenylmercuric chloride, 0.10 mole of cupric chloride, 20 ml. of dicyclohexylethylamine, 80 ml. of acetonitrile, 10 ml. of crotyl alcohol, and 100 ml. of 0.1 M LiPdCl$_3$ in acetonitrile was stirred at room temperature for two hours. Initial cooling with ice water was necessary to keep the temperature from going above 25° C. The reaction products were isolated by dilution with water and pentane extraction. Distillation of the extract gave 2.8 g. of colorless liquid product, B.P. 68–72° C. (3 mm.) Gas chromatographic analyses showed the material to be a mixture of two products in the ratio of about 3:1. Both gave positive tests with 2,4-dinitrophenylhydrazine in alcoholic sulfuric acid solution. The major product was isolated by preparative scale gas chromatography. The N.M.R. spectrum confirmed that the major product was 3-phenylbutyraldehyde. The 2,4 - dinitrophenylhydrazone of the product analyzed 58.35% C, 4.84% H and 17.13% N.

EXAMPLE 138

A reaction mixture containing 0.20 mole of 4-chloromercuri-1,2-dimethylbenzene, 0.20 mole of cupric chloride, 225 ml. of acetonitrile, 16.5 ml. of allyl alcohol, and 160 ml. of 0.1 M LiPdCl$_3$ in acetonitrile was stirred overnight at room temperature. The temperature rose to 40° C. initially before it could be cooled with ice water back to 25° C. The reaction was apparently complete in two hours because the gas chromatogram of the reaction mixture did not change after that. Isolation of the product as in Example 137 gave 8.6 g. of colorless liquid, B.P. 90–120° C. (3 mm.) which was about 50% 3-(3,4-dimethylphenyl)propionaldehyde. One of the several impurities in the product was probably 3-(2,3-dimethylphenyl)propionaldehyde judging from the N.M.R. spectrum of the crude product. This product no doubt arose from a minor amount of 3-chloromercuri-1,2-dimethylbenzene in the starting mercurial. A pure sample of the 3,4-dimethyl isomer was isolated by preparative scale gas chromatography $n_D^{25}$ 1.5225. The product analyzed 80.99% C and 8.53% H.

EXAMPLE 139

A reaction mixture of 0.10 mole of 4-chloromercuri-1,2-dichlorobenzene, 0.10 mole of cupric chloride, 20 ml. of dicyclohexylethylamine, 10 ml. of allyl alcohol and 100 ml. of 0.1 M LiPdCl$_3$ in acetonitrile was stirred at room temperature for two hours. Initial cooling was necessary to keep the temperature from rising above 25° C. The product was isolated as in Example 137. Distillation of the product under reduced pressure gave 3.0 g. of colorless liquid, B.P. 133–135° C. (4 mm.). This material was about 70% 3-(3,4-dichlorophenyl)propionaldehyde by gas chromatographic analyses. A pure sample was isolated by preparative scale gas chromatography. This sample analyzed 52.86% C and 4.24% H.

EXAMPLE 140

A mixture of 0.10 mole of p-chloromercurianisole, 0.10 mole of cupric chloride, 20 ml. of dicyclohexylethylamine, 70 ml. of acetonitrile, 10 ml. of allyl alcohol, and 100 ml. of 0.1 M LiPdCl$_3$ in acetonitrile was stirred at room temperature for three hours, with initial cooling to keep the temperature from rising above 25° C. Isolation of the product as in Example 137 gave 2.14 g. of brown liquid, B.P. 106–120° C. (3 mm.) which was 65% pure 3-anisylpropionaldehyde by gas chromatography. A sample was purified by preparative scale gas chromatography $n_D^{25}$ 1.5331. There were infrared bands from the product in carbon tetrachloride solution at 2800, 2700, and 1730 cm.$^{-1}$. The product analyzed 72.47% C and 7.26% H.

EXAMPLE 141

A reaction mixture containing 90 mmoles of 3-chloromercuribenzaldehyde, 0.10 mole of cupric chloride, 20 ml. of dicyclohexylethylamine, 80 ml. of acetonitrile, 10 ml. of methallyl alcohol, and 100 ml. of 0.1 M LiPdCl$_3$ in acetonitrile was stirred at room temperature for two hours. Initial cooling was necessary to keep the temperature from rising above 25° C. Isolation of the product, as in Example 137, gave 0.70 g. of green liquid product, B.P. 90–130° C. (2 mm.) which was only about 50% pure 3-(3-formylphenyl)-2-methylpropionaldehyde by gas chromatographic analyses. A sample was purified further by preparative scale gas chromatography. The product had $n_D^{25}$ 1.5383 and strong infrared bands in carbon tetrachloride solution at 2810, 2720, 1730, and 1710 cm.$^{-1}$. The 2,4-dinitrophenylhydrazone of this product analyzed 51.00% C and 3.81% H.

EXAMPLE 142

A reaction mixture of 0.10 mole phenylmercuric chloride, 0.10 mole of cupric chloride, 10 ml. of 1-buten-3-ol, 150 ml. of acetonitrile, and 50 ml. of 0.1 M LiPdCl$_3$ in acetonitrile was stirred at room temperature with slight cooling to keep the temperature below 25° C. and above 20° C. for 30 minutes. The black solution was now 0.22 M in 1-phenyl-3-butanone. Isolation of the product as in Example 137 gave 2.9 g. of colorless liquid, B.P. 97–120° C. (5½ mm.) which was 95% 1-phenyl-3-butanone by gas chromatographic analyses. A lower boiling fraction, 3.4 g., B.P. 56–98° C. (6 mm.) was mainly crotylbenzene. A pure sample of 1-phenyl-3-butanone was isolated by preparative scale gas chromatography. The product analyzed 80.87% C and 7.91% H.

EXAMPLE 143

A reaction mixture of 0.10 mole of phenylmercuric chloride, 0.10 mole of cupric chloride, 100 ml. of acetonitrile, 20 ml. of dicyclohexylethylamine, 10 ml. of 1-penten-3-ol, and 100 ml. of 0.1 M LiPdCl$_3$ in acetonitrile was stirred at room temperature for three hours with initial ice cooling to keep the temperature from rising above 25° C. The solution was now 0.25 M in 1-phenyl-3-pentanone. Isolation of the product as in Example 137 gave 2.4 g. of colorless product, B.P. 95–120° C. (3 mm.). The distillate was about 80% 1-phenyl-3-pentanone as determined by gas chromatographic analyses. A pure sample was isolated by preparative scale gas chromatography. The compound analyzed 81.40% C and 8.8% H.

EXAMPLE 144

A reaction was carried out as in Example 143 with 3-carbomethoxyphenylmercuric chloride used in place of phenylmercuric chloride. There was obtained as product, 2.43 g. of an orange liquid, B.P. 142–150° C. (2 mm.) which was about 60% 1-(3-carbomethoxyphenyl)-3-pentanone. A pure sample was separated by preparative scale gas chromatography. The compound analyzed 70.93% C and 7.08% H.

EXAMPLE 145

A mixture of 10 mmoles of 5-chloromercuri-3-nitro-1,2-dichlorobenzene, 10 mmoles of cupric chloride, 10 mmoles of lithium chloride, 12 ml. of 1.0 M 1-penten-3-ol and 10 ml. of 0.1 M LiPdCl$_3$ in acetonitrile was stirred at room temperature overnight. The reaction mixture was concentrated at room temperature under reduced pressure, and the product was extracted from the residue with boiling hexane. After concentrating and cooling, the hexane solution gave a sticky solid. Three further recrystallizations from aqueous methanol gave nearly colorless needles of 1-(3,4-dichloro-5-nitrophenyl-3-pentanone), M.P. 56.0–56.5° C., which analyzed 47.63% C, 4.19% H and 5.34% N. The compound forms a 2,4-dinitrophenylhydrazone of M.P. 158–159° C. which analyzed 45.15% C, 3.38% H and 15.60% N.

EXAMPLE 146

A reaction mixture containing 0.10 mole of phenylmercuric chloride, 0.10 mole of cupric chloride, 20 ml. of dicyclohexylethylamine, 10 ml. of 3-penten-2-ol, and 100 ml. of 0.1 M LiPdCl$_3$ in acetonitrile was stirred at room temperature for two hours. Initial cooling was necessary to keep the reaction mixture from warming up above 25° C. Isolation of the product as in Example 137 gave 2.9 g. of colorless liquid, B.P. 85–100° C. (2½ mm.), which was about 70% 2-phenyl-4-pentanone by gas chromatographic analyses. A pure sample was isolated by preparative scale gas chromatography, $n_D^{25}$ 1.5073. The compound analyzed 81.58% C and 8.37% H.

EXAMPLE 147

A mixture of 0.10 mole of phenylmercuric chloride, 0.10 mole of cupric chloride, 20 ml. of dicyclohexylethylamine, 10 ml. of cyclohexanol and 100 ml. of 0.1 M LiPdCl$_3$ in acetonitrile was stirred at room temperature overnight. The temperature of the reaction mixture rose initially to 37° C. before it could be cooled to 25° C. with an ice bath. The reaction mixture was found to be 0.35 M in 3-phenylcyclohexanone by gas chromatography. Isolation of the product as in Example 137 gave 5.34 g. of pale yellow liquid, B.P. 100–150° C. (3 mm.), which contained about 80% of 3-phenylcyclohexanone. Redistillation gave 2.6 g. of 95% pure material, B.P. 124–130° C. (3 mm.). A sample was further purified by preparative scale gas chromatography. The product had a carbonyl absorption in carbon tetrachloride solution at 1720 cm.$^{-1}$. The compound analyzed 82.51% C. and 8.68% H, and it gave an orange 2,4-dinitrophenylhydrazone, M.P. 170.0–170.5° C. which analyzed 60.99% C., 5.12% H. and 15.81% N.

EXAMPLE 148

A mixture of 0.10 mole of phenylmercuric acetate, 50 mmoles of mercuric acetate, 100 ml. of acetonitrile, 20 ml. of 2-methyl-3-buten-2-ol, and 10 mmoles of palladium acetate was stirred overnight at room temperature with initial cooling to keep temperature at about room temperature. Gas chromatographic analyses showed the solution to be 0.69 M in 2-methyl-4-phenyl-3-buten-2-ol. The product was isolated by the addition of water extraction with pentane, and distillation. There was obtained 8 g. of product, B.P. 100–107° C. (2 mm.). Recrystallization from pentane at −5° C. gave 6.4 g. of colorless needles, of 2-methyl-4-phenyl-3-buten-2-ol, M.P. 38.5–39.0° C. In isooctane solution, the product had bands at 292 ($\epsilon$=900), 283 ($\epsilon$=1270) and at 250 m$\mu$ ($\epsilon$=18,000). The infrared spectrum of the compound in carbon tetrachloride solution had bands at 3580, 3350, and 1580 cm.$^{-1}$. The N.M.R. spectrum in carbon tetrachloride solution at 60 mc. had bands at −7.18 cps. (singlet, 5 protons), −6.36 cps. (AB quarter, 2 protons), −3.27 cps. (singlet, 1 proton), and at −1.35 cps. (singlet, 6 protons) with respect to tetramethylsilane as an internal standard.

EXAMPLE 149

A mixture of 15.7 g. (50 mmoles) phenylmercuric chloride, 2.1 g. (50 mmoles) lithium chloride and 13.4 g. (100 mmoles) cupric chloride was placed in a pressure bottle. Air was displaced by ethylene and 40 g. acetic acid, 5 g. water and 5 ml. 0.1 molar Li$_2$PdCl$_4$ in acetic acid were added. Ethylene was then added to 30 p.s.i. and the mixture was stirred for 16 hours. The resulting solution was analyzed by gas chromatography whereby the product solution was shown to be 0.755 molar in 2-phenethyl chloride and 0.016 molar in styrene. Three such reactions were carried out and the products distributed between pentane and water. From the pentane was recovered by distillation 13.2 g., B.P. 105–115° C./41 mm., which analyzed 95% pure 2-phenylethyl chloride which is about 69% of the theoretical yield.

EXAMPLE 150

A mixture of 3.57 g. phenylmercuric bromide, 2.24 g. cupric bromide and 0.87 g. lithium bromide was placed in a pressure bottle with ethylene. To this was added 7 g. acetic acid, 1 g. water and 1 ml. 0.1 molar slurry of palladium nitrate in acetic acid. Ethylene was added to bring the pressure up to 30 p.s.i., and the mixture was stirred for 16 hours. Analysis by gas chromatography showed the solution to be 0.135 molar in 2-phenethyl bromide which is 13.5% of theory. Bromobenzene was a by-product.

EXAMPLE 151

Example 149 was repeated using propylene in place of ethylene. From a combination of three runs there was obtained 17 g. product boiling in the range of 59–160° C./6 mm. which analyzed about 33% propenylbenzene and 67% 1-phenyl-2-propyl chloride. The propenylbenzene fraction separated by chromatography analyzed 91.16% C. and 9.06% H. The 1-phenyl-2-propyl chloride fraction analyzed 69.97% C.; 7.63% H; 23.0% Cl, and the N.M.R. spectrum confirmed the structure.

EXAMPLE 152

A mixture of 3.63 g. 2-naphthylmercuric chloride, 0.42 g. lithium chloride, 1.34 g. cupric chloride, 7 g. acetic acid, 1 g. water, and 1 ml. 0.1 molar $Li_2PdCl_4$ in acetic acid was reacted 16 hours with ethylene at 30 p.s.i. and the product was distributed between water and methylene chloride. From the methylene chloride was obtained 0.57 g. 2-napthylethyl chloride, m.p. 46.5–47.5°C., which was 30% of theory. Further crystallization from pentane gave a purer product, M.P. 47–47.5° C., which analyzed 74.98% C, 5.99% H and 18.8% Cl. The N.M.R. spectrum confirmed the structure.

EXAMPLE 153

A mixture of 3.57 g. p-chloromercuribenzoic acid, 0.42 g. lithium chloride, 1.34 g. cupric chloride, 8 g. acetic acid, 1 g. water and 1 ml. 0.1 molar $Li_2PdCl_4$ in acetic acid was stirred 16 hours under 30 p.s.i. ethylene. The product was distributed between methylene chloride and water and recovered from the mthylene chloride as 1.33 g. colorless crystals which melted at 200–201° C. Crystallization from aqueous methanol did not change the melting point. The analysis of 58.88% C; 5.21% H; 19.15% Cl confirmed the product to be p(2-chloroethyl) benzoic acid. The yield was 72% of theory.

EXAMPLE 154

A mixture of 15.95 g. (50 mmoles) 2-chloromercurithiophene, 13.4 g. (100 mmoles) cupric chloride, 2.1 g. (50 mmoles) lithium chloride, 50 g. acetic acid, 5 g. water and 5 ml. 0.1 molar $Li_2PdCl_4$ in acetic acid was stirred 16 hours under 30 p.s.i. ethylene. Three such preparations were carried out and combined. The product was separated by methylene chloride extraction and distilled to obtain 3.2 g. 2-thienylethyl chloride which boiled at 69–70° C. at 7 mm. The yield was 13% of theory.

EXAMPLE 155

A mixture of 15.7 g. (50 mmoles) phenylmercuric chloride, 26.8 g. (200 mmoles) cupric chloride, 2.1 g. (50 mmoles) lithium chloride, 35 g. acetic acid, 4.2 g. acrolein, 5 water, and 5 ml. 0.1 molar $Li_2PdCl_4$ in acetic acid was held at about 0° C. while combining the ingredients and was then stirred at about 25° C. for 16 hours. From this mixture was isolated a distillable product (18.3 g.) boiling in the range of 80–101.5° C./7.5 mm. which was purified as the sodium bisulfite adduct and then redistilled, B.P. 101° C./7.5 mm. The distilled 2-chloro-3-phenylpropionaldehyde analyzed 63.99% C; 5.72% H; 21.6% Cl. The structure was confirmed by the N.M.R. spectrum.

EXAMPLE 156

A mixture of 1.9 g. (5 mmoles) p-chloromercuridiethylaniline, 0.21 g. (5 mmoles) lithium chloride, 1.34 g. (10 mmoles) cupric chloride, 8 g. acetic acid, 1 g. water, and 1 ml. 0.1 molar $Li_2PdCl_4$ in acetic acid was stirred 16 hours at 25° C. under ethylene at 30 p.s.i. The product was separated by distribution between water and methylene chloride and recovery from the methylene chloride. About 0.2 g. liquid 2-(p-diethylaminophenyl) ethyl chloride (20% of theory) was recovered. It analyzed 67.62% C; 8.79 % H and 15.8% Cl. The structure was verified by the N.M.R. spectrum.

EXAMPLE 157

A mixture of 7.2 g. (20 mmoles) m-chloromercurinitrobenzene, 5.36 g. (40 mmoles) cupric chloride, 2.68 g. (20 mmoles) lithium chloride, 16 g. acetic acid, 2 g. water, and 1 ml. 0.1 molar $Li_2PdCl_4$ in acetic acid was stirred at 24° C. for 16 hours under 30 p.s.i. ethylene. The resulting solution was shown by gas chromatography to be 0.5 molar in m-nitrophenethyl chloride corresponding to a 47% of theoretical yield. By distillation 2.3 g. m-nitrophenethyl chloride boiling range 95–145° C./4.5 mm. was recovered. After crystallization from a benzene-hexane mixture, it melted at 28–29° C. and analyzed 51.48% C, 4.67% H, 19.7% Cl. The structure was verified by the N.M.R. spectrum.

EXAMPLE 158

A mixture of 3.6 g. (10 mmoles) p-chloromercuribenzoic acid, 0.42 g. (10 mmoles) lithium chloride, 1.34 g. (10 mmoles) cupric chloride, 7 g. acetic acid, 1 g. water, 1 g. 2:2:1-bicycloheptene and 1 ml. 0.1 molar $Li_2PdCl_4$ in acetic acid was stirred for 16 hours at 24° C. The product was recovered by extraction with methylene chloride and crystallization from aqueous methanol. The yield was 0.11 g. solid and the melting point of the purified product was 226–227.5° C. (4% of theoretical yield). The product, probably 7-p-carboxyphenyl-2-chloro-2:2:1-bicycloheptane, was further characterized by its carboxyl absorption in infrared at 1695 cm.$^{-1}$ and its analysis: 67.02% C, 6.43% H, 14.9% Cl.

EXAMPLE 159

A mixture of 3.6 g. (10 mmoles) phenylmercuric chloride, 0.42 g. (10 mmoles) lithium chloride, 2.7 g. (20 mmoles) cupric chloride, 7 g. acetic acid, 0.8 g. methyl vinyl ketone, 1 g. water and 1 ml. 0.1 molar $Li_2PdCl_4$ in acetic acid was stirred at 24° C. for 16 hours. Analysis by gas chromatography showed the resulting solution to be 0.8 molar in 1-phenyl-2-chloro-3-butanone and 0.2 molar in benzalacetone. The product was separated by methylene chloride extraction, the benzalacetone was oxidized with potassium permanganate and its oxidation products were removed leaving a crude 1-phenyl-2-chloro-3-butanone whose N.M.R. spectrum in deuterochoroform at 60 megacycles showed bands at −131 (singlet of relative intensity 3 from the methyl group), at −189 (AB part of ABX spectrum, $J_{AB=14}$; $J_{AX=8}$; $J_{BX=6.5}$ with relative intensity 2 from the benzyl methylene group) at −261 (quartet, $J_{AX=8}$, $J_{BX=6.5}$ with relative intensity 1 from the

group) and at −429 cps. (a singlet of relative intensity 5 from the aromatic protons) with respect to tetramethyl silane as the internal standard.

What I claim and desire to protect by Letters Patent is:

1. The process which comprises contacting a compound of the formula

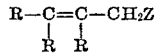

wherein R is hydrogen or a saturated aliphatic hydrocarbon radical containing 1 to 30 carbon atoms and Z is

where R' is a saturated aliphatic hydrocarbon radical containing 1 to 12 carbon atoms, at a temperature in the range of −70° C. to about 200° C. with an organometallic compound formed by reacting a Group VIII metal salt with an aryl mercury, tin or lead compound selected from the group consisting of QHgX, Q₂Hg, QSnX₃, Q₂SnX₂, Q₃SnX, Q₄Sn and Q₄Pb, wherein Q is phenyl, naphthyl, or phenyl or naphthyl substituted with at least one member of the group consisting of alkyl of 1 to 4 carbon atoms, alkoxy of 1 to 4 carbon atoms, —NO₂, —F, —Cl and —Br, the metal of said Group VIII metal salt being selected from the group consisting of palladium, platinum, rhodium, ruthenium, osmium and iridium, and the anion of said Group VIII metal salt and the anion X of said aryl mercury, tin or lead compound both being selected from the group consisting of fluoride, chloride, bromide, cyanide, nitrate, sulfate, bisulfate and carboxylate containing 2 to 10 carbon atoms.

2. The process of claim 1 in which the aryl mercury, tin or lead compound is QHgX or Q₂Hg.

3. The process of claim 2 in which the Group VIII metal salt is a salt of divalent palladium.

4. The process of claim 3 in which QHgX is phenyl mercuric acetate and the salt of divalent palladium is palladium acetate.

5. The process of claim 4 in which the compound of the formula

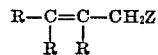

is allyl acetate.

6. The process of claim 1 in which the organometallic compound is produced in situ under the reaction conditions of said process.

References Cited

Rappoport et al.: Tetrahedron Letters, No. 42, pp. 3719–3728, 1965.

VIVIAN GARNER, Primary Examiner

U.S. Cl. X.R.

260—329 R, 330.5, 332.2 A, 332.5, 346.2 R, 347.4, 347.8, 404, 408, 410.5, 429 R, 429.7, 429.9, 433, 434, 435, 448 A, 465 D, 465 E, 465 G, 465 K, 468 R, 469, 471 R, 473 A, 473 R, 475 N, 475 SC, 476 R, 479 R, 486 R, 490, 511, 512 C, 512 R, 520, 521 R, 562 A, 562 P, 562 R, 574, 577, 590, 592, 599, 611 A, 612 D, 612 R, 613 D, 618 R, 645, 649 R, 650 R, 651 R, 668 R, 669 QZ

UNITED STATES PATENT OFFICE
CERTIFICATE OF CORRECTION

Patent No. 3,705,919      Dated December 12, 1972

Inventor(s) Richard F. Heck

It is certified that error appears in the above-identified patent and that said Letters Patent are hereby corrected as shown below:

Column 7, line 67, " II-A " should read --- III-A --.

Column 11, line 17 after " diphenyl- " insert -- mercury in acetonitrile by injection. After agitation for --.

Column 33, line 30, " dichloroalkylbenzene " should read -- dichloroallylbenzene --.

Signed and sealed this 15th day of May 1973.

(SEAL)
Attest:

EDWARD M. FLETCHER, JR.
Attesting Officer

ROBERT GOTTSCHALK
Commissioner of Patents